United States Patent
Jang et al.

(10) Patent No.: US 12,526,467 B2
(45) Date of Patent: Jan. 13, 2026

(54) MESSENGER CONNECTION METHOD IN MULTI-MESSENGER SERVICE ENVIRONMENT, AND DEVICE THEREFOR

(71) Applicant: Samsung Electronics Co., Ltd., Suwon-si (KR)

(72) Inventors: Moonseok Jang, Suwon-si (KR); Hongjin Cho, Suwon-si (KR); Nakkyong Kim, Suwon-si (KR); Kwangjin Noh, Suwon-si (KR); Zion Park, Suwon-si (KR); Jinhee Park, Suwon-si (KR); Beomho Seo, Suwon-si (KR); Jaeman Yoo, Suwon-si (KR)

(73) Assignee: Samsung Electronics Co., Ltd., Suwon-si (KR)

( * ) Notice: Subject to any disclaimer, the term of this patent is extended or adjusted under 35 U.S.C. 154(b) by 71 days.

(21) Appl. No.: 18/468,422

(22) Filed: Sep. 15, 2023

(65) Prior Publication Data
US 2024/0007697 A1    Jan. 4, 2024

Related U.S. Application Data

(63) Continuation of application No. PCT/KR2022/003745, filed on Mar. 17, 2022.

(30) Foreign Application Priority Data

Mar. 17, 2021    (KR) .......................... 10-2021-0034863

(51) Int. Cl.
*G06F 15/16*    (2006.01)
*G06F 21/31*    (2013.01)
(Continued)

(52) U.S. Cl.
CPC ......... *H04N 21/4222* (2013.01); *G06F 21/31* (2013.01); *H04L 51/046* (2013.01);
(Continued)

(58) Field of Classification Search
None
See application file for complete search history.

(56) References Cited

U.S. PATENT DOCUMENTS 9,204,197 B2    12/2015    Kim et al.
9,591,346 B2    3/2017    Hu et al.
(Continued)

FOREIGN PATENT DOCUMENTS

KR    20060124890 A    12/2006
KR    100697099 B1    3/2007
(Continued)

OTHER PUBLICATIONS

You can control the remote control by simply connecting to Olleh TV Kakao Talk Plus friends, Pink Iguana, Jul. 14, 2015, 5 pages.
(Continued)

*Primary Examiner* — Wing F Chan
*Assistant Examiner* — Andrew Woo
(74) *Attorney, Agent, or Firm* — Nixon & Vanderhye, P.C.

(57) ABSTRACT

An example method of performing a messenger connection control between an electronic device and a display device in a server computing apparatus includes receiving a request for a connection to the display device from the electronic device via a messenger application, identifying a type of the messenger application used for the connection request, performing authentication of the electronic device and the display device, based on the authentication of the electronic device and the display device, generating messenger connection information including messenger identification information indicating the identified type of messenger application, user identification information for identifying a user using the messenger application on the electronic device, and connected device identification information for
(Continued)

identifying the display device, and performing, based on the generated messenger connection information, messenger connection control between the electronic device and the display device.

20 Claims, 26 Drawing Sheets

(51) Int. Cl.
  *H04L 51/046* (2022.01)
  *H04N 21/2668* (2011.01)
  *H04N 21/422* (2011.01)
  *H04N 21/4788* (2011.01)
  *H04N 21/81* (2011.01)

(52) U.S. Cl.
  CPC ..... *H04N 21/2668* (2013.01); *H04N 21/4788* (2013.01); *H04N 21/8173* (2013.01)

(56) References Cited

U.S. PATENT DOCUMENTS

| | | | |
|---|---|---|---|
| 9,817,903 | B2 | 11/2017 | Gilbert et al. |
| 9,936,012 | B2 | 4/2018 | Park |
| 10,091,272 | B2 | 10/2018 | Cho et al. |
| 11,171,896 | B2 | 11/2021 | Kim |
| 2003/0101343 | A1* | 5/2003 | Eaton ................. H04L 51/04 713/170 |
| 2008/0113679 | A1 | 5/2008 | Sung et al. |
| 2010/0071053 | A1 | 3/2010 | Ansari et al. |
| 2014/0055552 | A1* | 2/2014 | Song ................. H04L 12/1818 348/14.02 |
| 2015/0271551 | A1 | 9/2015 | Lee |

FOREIGN PATENT DOCUMENTS

| | | | |
|---|---|---|---|
| KR | 100726181 | B1 | 6/2007 |
| KR | 20110014920 | A | 2/2011 |
| KR | 101331513 | B1 | 11/2013 |
| KR | 20140059591 | A | 5/2014 |
| KR | 20140099982 | A | 8/2014 |
| KR | 20140110665 | A | 9/2014 |
| KR | 20150013531 | A | 2/2015 |
| KR | 20150073488 | A * | 7/2015 .............. H04W 4/50 |
| KR | 101844585 | B1 | 4/2018 |
| KR | 101923441 | B1 | 11/2018 |
| KR | 101977317 | B1 | 5/2019 |

OTHER PUBLICATIONS

International Search Report for PCT/KR2022/003745 mailed Jun. 24, 2022, 5 pages.

Extended Search Report dated Jun. 25, 2024 for European Patent Application No. 22771783.2.

Office Action dated Sep. 22, 2025 in KR Patent Application No. 10-2021-0034863 and English-language translation.

* cited by examiner

MESSENGER CONNECTION METHOD IN MULTI-MESSENGER SERVICE ENVIRONMENT, AND DEVICE THEREFOR

CROSS-REFERENCE TO RELATED APPLICATIONS

This application is a continuation of International Application No. PCT/KR2022/003745 designating the United States, filed on Mar. 17, 2022, in the Korean Intellectual Property Receiving Office and claiming priority to Korean Patent Application No. 10-2021-0034863, filed on Mar. 17, 2021, in the Korean Intellectual Property Office, the disclosures of which are incorporated by reference herein in their entireties.

BACKGROUND

Field

The disclosure relates to a messenger connection method and apparatus in a multi-messenger service environment, and more specifically, to a server computing apparatus and a display device and operation method thereof which enable one or more messenger connections in a multi-messenger service environment.

Description of Related Art

Smart devices may use various social messenger applications. With various messenger applications, users may selectively use a messenger convenient for them by country, region, and age. In addition, the users do not use only one messenger application, but also use various types of messenger applications.

Users use social messenger applications mainly to communicate with other users, but recently they are able to exchange messages not only with other users but also virtual counterparts, such as channels or pages provided by a messenger platform.

In recent years, a technique for controlling a display device such as a television using a messenger application has been proposed, but because users use various messenger applications, a method of creating a messenger connection with a display device using different types of messenger applications is required.

SUMMARY

Embodiments of the disclosure provide a method and apparatus for enabling users to establish a messenger connection with a display device using a plurality of multi-messenger applications in a multi-messenger service environment where different types of messenger services are provided.

According to an example embodiment, a method of performing a messenger connection control between an electronic device and a display device in a server computing apparatus may include receiving a request for a connection to the display device from the electronic device via a messenger application, identifying a type of the messenger application used for the connection request, performing authentication of the electronic device and the display device, based on the authentication of the electronic device and the display device, generating messenger connection information including messenger identification information indicating the identified type of messenger application, user identification information for identifying a user using the messenger application on the electronic device, and connected device identification information for identifying the display device, and performing, based on the generated messenger connection information, a messenger connection control between the electronic device and the display device.

According to an example embodiment, the performing of the authentication of the electronic device and the display device may include receiving, from the electronic device, via the messenger application, an authentication number generated by the display device and output on a screen of the display device, receiving, from the display device, the authentication number generated by the display device, and determining whether the authentication number output from the display device matches the authentication number received from the electronic device.

According to an example embodiment, the method may further include receiving a message to be delivered to the display device from a user for whom the messenger connection information is generated, processing the received message based on messenger identification information corresponding to the message, and transmitting the processed message to the display device.

According to an example embodiment, an operation method of a display device may include receiving a message transmitted via a messenger system, identifying messenger connection information corresponding to a user who transmitted the message and a type of a messenger application used for the message, obtaining stored profile information corresponding to the identified messenger connection information, and responding to the message or controlling an operation of the display device, based on the obtained profile information.

According to an example embodiment, the operation method may further include collecting, based on the messenger connection information, information about behavior of the user performed on the display device or information about an environment of the display device, and generating, as the profile information corresponding to the messenger connection information, the collected information about the behavior of the user or information about the environment.

According to an example embodiment, the operation method may further include obtaining content information or advertisement information recommended based on the profile information corresponding to the messenger connection information regarding the user, and transmitting a message relating to the recommended content information or advertisement information to the electronic device via the messenger application.

According to an example embodiment, the operation method may further include switching between a family mode in which the display device is not messenger-connected and a messenger connection mode in which the display device is messenger-connected to the user.

According to an example embodiment, the operation method may further include switching to a messenger connection mode corresponding to the user in response to reception of the message from the user, from the family mode in which the display device is not messenger-connected or from a state in which the display device is messenger-connected to another user, and the switching may further include obtaining messenger connection information regarding the user who has transmitted the message, and controlling an operation of the display device based on profile information corresponding to the messenger connection information regarding the user.

According to an example embodiment, the switching may further include controlling the display device to automatically execute an application included in the profile information according to the profile information corresponding to the messenger connection information regarding the user.

According to an example embodiment, the controlling of the display device may include controlling an environment of the display device based on environment settings information included in the profile information or performing automatic login to the application according to account login information included in the profile information.

According to an example embodiment, the switching may further include switching to the family mode based on the messenger connection being released while the display device is operating in the messenger connection mode, and controlling the display device to change the environment of the display device based on default profile information corresponding to the family mode.

According to an example embodiment, the switching may further include, in response to reception of a request to power off the display device while the display is operating in the messenger connection mode, controlling the display device to maintain the messenger connection mode when the display device is powered on within a predetermined time after power off and switch to the family mode when the display device is powered on after a lapse of the predetermined time.

According to an example embodiment, the operation method may further include, in response to reception of a content sharing request message from the user during playback of content in the messenger connection mode, controlling generation of a chat room including metadata containing information about the played content, sharing the metadata about the generated chat room on a counterpart display device of a counterpart user with whom to share the content, and displaying, according to the sharing operation, a multi-view including a content play window and a chat window corresponding to the chat room.

According to an example embodiment, the sharing of the metadata about the generated chat room on the counterpart display device with whom to share the content may include controlling a key used to access the chat room to be provided to a counterpart electronic device of the counterpart user with whom to share the content, receiving, from the counterpart display device connected to the counterpart electronic device, a request to access the chat room using the key, and according to authentication of the key in response to the request to access the chat room, transmitting the metadata about the chat room to the counterpart display device, and the metadata about the chat room may include information about the content to be shared and address information for accessing the chat room.

According to an example embodiment, a server computing apparatus for performing messenger connection control between an electronic device and a display device may include a communication interface, a memory storing one or more instructions, and a processor configured to execute the one or more instructions stored in the memory to receive a request for a connection to the display device from the electronic device via a messenger application, identify a type of the messenger application used for the connection request, perform authentication of the electronic device and the display device, based on the authentication of the electronic device and the display device, generate messenger connection information including messenger identification information indicating the identified type of messenger application, user identification information for identifying a user using the messenger application on the electronic device, and connected device identification information for identifying the display device, and perform, based on the generated messenger connection information, a messenger connection control between the electronic device and the display device.

According to an example embodiment, a display device may include a communication interface, a memory storing one or more instructions, and a processor configured to execute the one or more instructions stored in the memory to receive a message transmitted via a messenger system, identify messenger connection information corresponding to a user who has transmitted the message and a type of a messenger application used for the message, obtain stored profile information corresponding to the identified messenger connection information, and respond to the message or control an operation of the display device, based on the obtained profile information.

According to various example embodiments of the disclosure, a messenger service connection server may, for example, conveniently provide a messenger connection between a user and a display device using different types of messenger applications by creating messenger connections based on a plurality of messenger applications.

According to various example embodiments of the disclosure, the display device may, for example, provide customized and personalized information to a user that is messenger connected thereto by monitoring and accumulating information about behavior of the messenger connected user.

According to various example embodiments of the disclosure, an environment in which a user may more conveniently share content with other users may be provided using a messenger system.

BRIEF DESCRIPTION OF THE DRAWINGS

The above and other aspects, features and advantages of certain embodiments of the present disclosure will be more apparent from the following detailed description, taken in conjunction with the accompanying drawings, in which.

DETAILED DESCRIPTION

Figure 1:
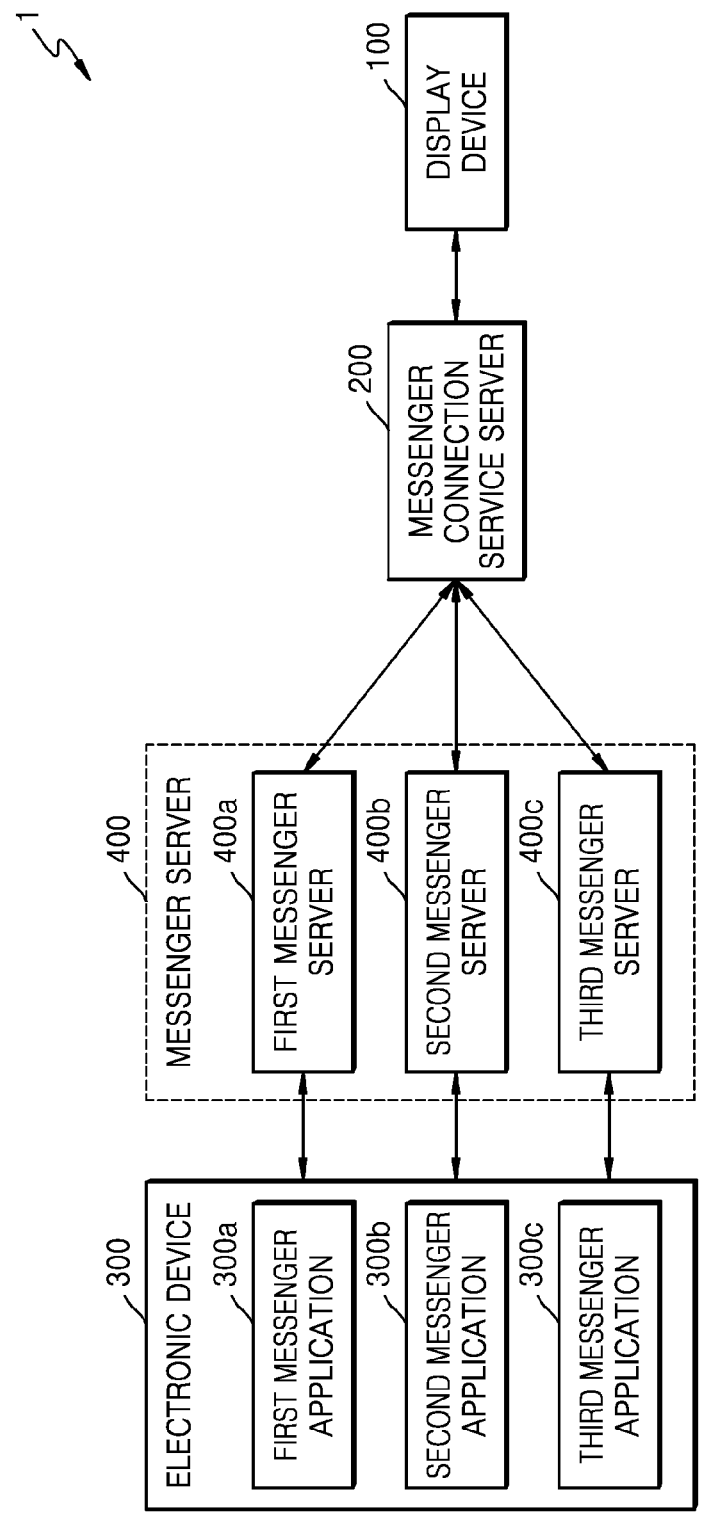
FIG. 1 is a diagram for describing the concept of an example system enabling one or more messenger connections between an electronic device and a display device, according to various embodiments.

Terms used in the present specification will now be briefly described and then the present disclosure will be described in detail.

The terms used in the present disclosure may be general terms currently widely used in the art based on functions described in the present disclosure, but may be changed according to an intention of a technician engaged in the art, precedent cases, advent of new technologies, etc. Furthermore, specific terms may be arbitrarily selected by the applicant, and in this case, the meaning of the selected terms will be described in detail in the detailed description of the disclosure. Thus, the terms used herein should be defined not by simple appellations thereof but based on the meaning of the terms together with the overall description of the present disclosure.

Throughout the specification, when a part "includes" or "comprises" an element, unless there is a particular description contrary thereto, it is understood that the part may further include other elements, not excluding the other elements. In addition, terms such as "portion", "module", etc., described in the specification refer to a unit for processing at least one function or operation and may be embodied as hardware or software, or a combination of hardware and software.

Embodiments will now be described more fully hereinafter with reference to the accompanying drawings so that they may be easily implemented by one of ordinary skill in the art. However, the present disclosure may have different forms and should not be construed as being limited to embodiments set forth herein. In addition, parts not related to descriptions of the present disclosure are omitted to clearly explain the disclosure in the drawings, and like reference numerals denote like elements throughout.

In an embodiment in the present specification, the term "user" may, for example, refer to a person who controls a function or operation of a computing apparatus or an electronic device by using a control device, and may include a viewer, an administrator, or an installation engineer.

FIG. 1 is a diagram for describing the concept of an example system 1 that enables one or more messenger connections between an electronic device and a display device, according to various embodiments.

Referring to FIG. 1, the system 1 may include a display device 100, a messenger connection service server 200, an electronic device 300, and a messenger server 400.

The electronic device 300 may represent a smart device through which a user is able to transmit a message to or receive a message from the display device 100 using one or more messenger applications. The electronic device 300 may be a smartphone but is not limited thereto, and may be implemented as a device that includes a memory and a processor and performs a function according to a user's request. For example, the electronic device 300 may be implemented as various electronic devices, such as a mobile phone, a tablet personal computer (PC), a digital camera, a camcorder, a laptop computer, a desktop computer, an e-book terminal, a digital broadcasting terminal, a personal digital assistant (PDA), a portable multimedia player (PMP), a navigation device, an MP3 player, a wearable device, etc. Also, the electronic device 300 may, for example, be referred to as a portable device or a computing device according to the functionality of the electronic device 300.

The electronic device 300 may include one or more messenger applications, for example, a first messenger application 300a, a second messenger application 300b, and a third messenger application 300c. The user of the electronic device 300 may not only exchange messages with other users using one or more installed messenger applications but also exchange messages with the display device 100 using functions described in the present disclosure.

The messenger server 400 may represent a server computer for providing a messenger service. The messenger server 400 may include one or more messenger servers operated and managed by various operators or various service providers. For example, the messenger server 400 may include a first messenger server 400a, a second messenger server 400b, and a third messenger server 400c. Each of the first messenger server 400a, the second messenger server 400b, and the third messenger server 400c may, for example, be operated by different operators or different service providers and may process messages via a message format or a message transmission path suitable for its own messenger system. For example, in the electronic device 300, when the user desires to transmit and receive messages using the first messenger application 300a, the first messenger server 400a may provide a messenger service via a message format or a message transmission path suitable for a first messenger system. For example, in the electronic device 300, when the user desires to transmit and receive messages using the second messenger application 300b, the second messenger server 400b may provide a messenger service via a message format or a message transmission path suitable for a second messenger system. Because the message format suitable for the first messenger system is different from the message format suitable for the second messenger system, the display device 100 needs to be equipped with applications or systems respectively corresponding to a plurality of messenger systems to establish a messenger connection with the electronic device 300 via the plurality of messenger systems. However, when the display device must have applications or systems respectively corresponding to a plurality of messenger systems, the operation complexity of the display device increases. Various example embodiments disclosed herein propose a messenger connection service server that enables integration of a plurality of different messenger systems and processing of messages.

The messenger connection service server 200 may, for example, represent a server computer that enables a messenger connection between the electronic device 300 and the display device 100.

According to an embodiment, the messenger connection service server 200 may generate and manage messenger connection information indicating a messenger connection relationship between the electronic device 300 and the display device 100 in response to a messenger connection request from the electronic device 300 via the messenger server 400.

According to an embodiment, the messenger connection service server 200 may transmit messages from the plurality of messenger servers between the electronic device 300 and the display device 100 by distinguishing and processing different message formats respectively used by the plurality of messenger servers.

According to an embodiment, the messenger connection service server 200 may receive a request for connection to the display device 100 from the electronic device 300 via a messenger application, and identify a type of the messenger application used to receive the connection request.

According to an embodiment, when there is a messenger connection request from the electronic device 300, the messenger connection service server 200 may perform authentication of the electronic device 300 and the display device 100, and when the authentication is completed, generate messenger connection information indicating a messenger connection relationship between the electronic device 300 and the display device 100. According to an embodiment, the messenger connection information may include messenger identification information indicating the identified type of messenger application, user identification information for identifying a user using the messenger application on the electronic device 300, and connected device identification information for identifying the display device 100.

According to an embodiment, the messenger connection service server 200 may perform a messenger conversion control between the electronic device and the display device based on the connection information generated in this way.

According to an embodiment, the display device 100 may be a television (TV) but is not limited thereto, and may be implemented as a device that includes a memory and a processor and displays an image according to a user's request. For example, the display device 100 may be implemented as various electronic devices, such as a mobile phone, a tablet PC, a digital camera, a camcorder, a laptop computer, a desktop computer, an e-book terminal, a digital broadcasting terminal, a PDA, a PMP, a navigation device, an MP3 player, a wearable device, etc. In addition, the display device 100 may be implemented in a stationary or portable form, and may be a digital broadcasting receiver capable of receiving digital broadcasts. The term "display device" is used herein simply for ease in distinguishing in this disclosure the display device from the electronic device 300 included in the system 1, and any type of device that performs functions of the display device in the present disclosure may be referred to as an electronic device, a computing device, or the like.

According to an embodiment, the display device 100 may include a messenger connection manager for managing a messenger connection from the electronic device 300 via the messenger server 400.

According to an embodiment, the display device 100 may receive from the messenger connection service server 200 and store messenger connection information including one or more messenger connection relationships of the display device 100.

According to an embodiment, the display device 100 may operate in a messenger connection mode based on the one or more messenger connection relationships included in the stored messenger connection information. For example, when the display device 100 operates in a messenger connection mode with a user who is messenger connected thereto, the display device 100 may provide a display device environment suitable for the messenger connected user, provide recommendation information suitable for the user, or automatically perform an application login operation using prestored user account login information.

According to an embodiment, the display device 100 may store information about behavior(s) of the messenger connected user or its environment information in the messenger connection mode as profile information corresponding to corresponding messenger connection information.

According to an embodiment, when the messenger connection is released while the display device 100 is operating in the messenger connection mode, the display device 100 may switch to a family mode in which messenger connection information or profile information about the corresponding messenger connected user is no longer referred to.

According to an embodiment, the display device 100 may share content played by the display device 100 with another user's display device according to a user request in the messenger connection mode.

Figure 2:
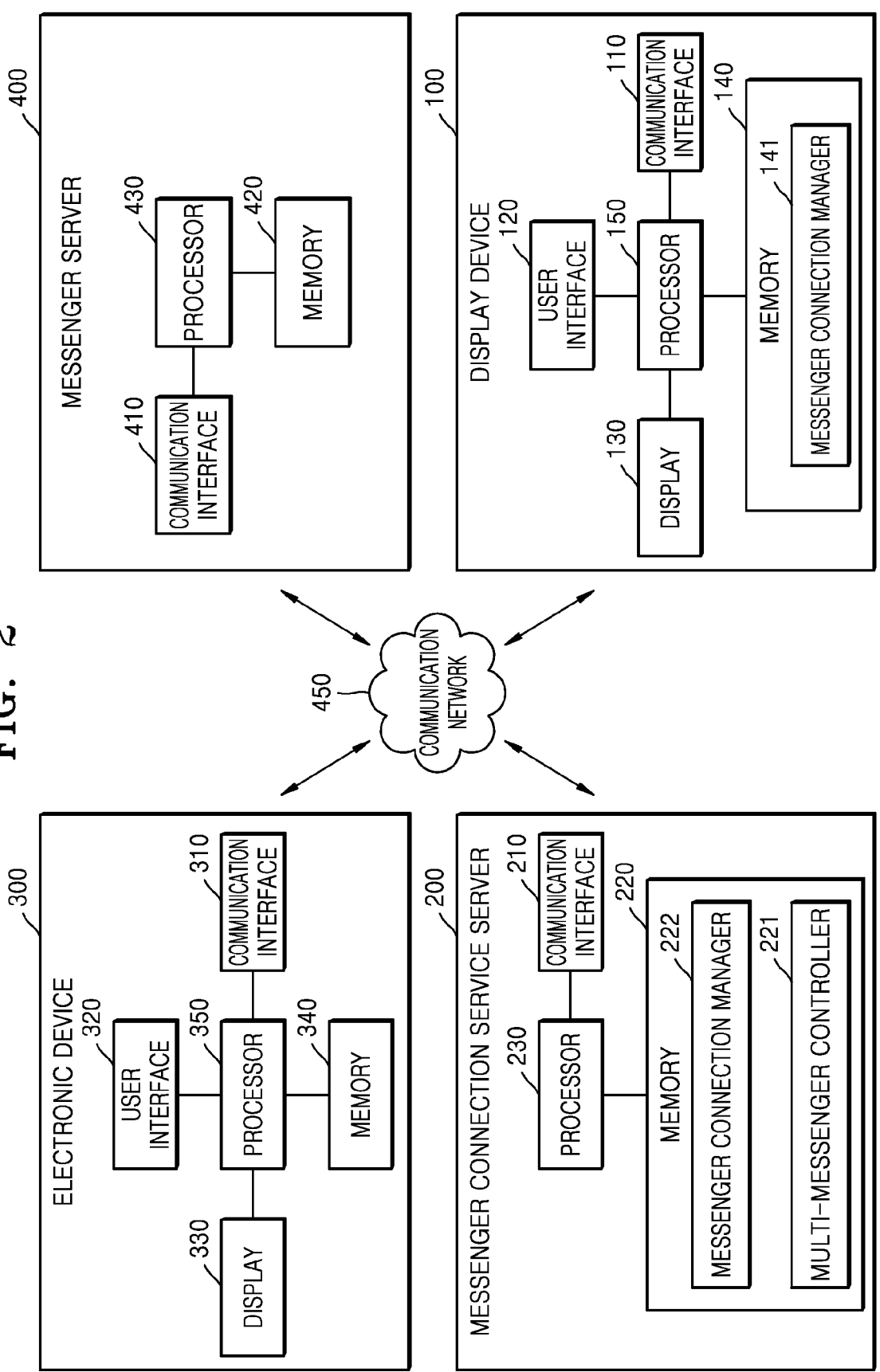
FIG. 2 is a diagram for describing detailed configurations of example devices included in an example system enabling one or more messenger connections between an electronic device and a display device, according to various embodiments.

FIG. 2 is a diagram for describing detailed configurations of devices included in an example system enabling one or more messenger connections between an electronic device and a display device, according to various embodiments.

Referring to FIG. 2, the system may include a display device 100, a messenger connection service server 200, an electronic device 300, a messenger server 400, and a communication network 450 connecting each device included in the system.

The electronic device 300 may include a communication interface 310, a user interface 320, a display 330, a memory 340, and a processor 350. However, the electronic device 300 may, for example, be implemented with more components than those shown in FIG. 2, and is not limited to the above example.

The communication interface 310 (including, e.g., a communication interface circuit) may communicate with the messenger server 400 over the communication network 450.

The user interface 320 may be any form of interface capable of receiving a user input. For example, the user interface 320 may be arranged on a portion of the electronic device 300 and include a manipulation button capable of receiving a user input, a light receiver capable of receiving an input from a remote control device, a touch input when the display is implemented as a touch sensitive display, a microphone for receiving a voice uttered by the user, etc.

The display 330 may output images or data processed by the electronic device 300.

The memory 340 may store programs necessary for processing or control by the processor 350, and store data input to or output from the electronic device 300.

The memory 340 may include at least one type of storage medium among a flash memory-type memory, a hard disk-type memory, a multimedia card micro-type memory, a card-type memory (e.g., an SD card or an XD memory), random access memory (RAM), static RAM (SRAM), read-only memory (ROM), electrically erasable programmable ROM (EEPROM), PROM, a magnetic memory, a magnetic disc, and an optical disc.

The processor 350 controls all operations of the electronic device 300. For example, the processor 350 may execute one or more instructions stored in the memory 340 to perform functions of the electronic device 300 described in the present disclosure.

In an example embodiment of the disclosure, the processor 350 may execute one or more instructions stored in the memory 340 to control or cause the above-described operations to be performed. In this case, the memory 340 may store one or more instructions executable by the processor 350.

Also, in an example embodiment of the disclosure, the processor 350 may store one or more instructions in an internal memory provided therein and execute the one or more instructions stored in the internal memory to control the above-described operations to be performed. In other words, the processor 350 may execute at least one instruction or program stored in the internal memory provided in the processor 350 or the memory 340 to perform specified operations.

According to a request from the user of the electronic device 300, the electronic device 300 may add or set the display device 100 as a virtual friend by requesting creation of a connection relationship with the display device 100 using a messenger application installed on the electronic device 300.

The user of the electronic device 300 may use a messenger application to transmit a message to or receive a message from the display device 100 with which a connection relationship is created.

The electronic device 300 may be any type of device that performs functions by including a processor and a memory. The electronic device 100 may be a stationary or portable device. Examples of the electronic device 300 may include various electronic devices, such as computers such as a desktop, a laptop, and a tablet, TVs, set-top boxes, smartphones, cellular phones, game players, music players, video players, medical equipment, home appliances, etc. The electronic device 300 may, for example, also be referred to as a display device, a computing device, or a media device.

The messenger server 400 may, for example, represent a server that enables transmission and reception of text messages, voice messages, web pages, or content playback links among users registered with the messenger server 400 via a messenger system or a messenger application. The messenger server 400 may include a communication interface 410 (including, e.g., a communication interface circuit), a memory 420, and a processor 430. The messenger server 400 may be implemented with more components than those shown in FIG. 2, and is not limited to the above example.

The messenger server 400 may transmit a message received from the electronic device 300 to the messenger connection service server 200 for delivery to the display device 100, and receive a message to be transmitted from the display device 100 to the electronic device 300 from the messenger connection service server 200 and transmit the message to the electronic device 100.

The messenger connection service server 200 may serve to enable messenger connections between the display device 100 and the electronic device 300 using one or more messenger systems.

The messenger connection service server 200 may include a communication interface 210, a memory 220, and a processor 230.

The communication interface 210 (including, e.g., a communication interface circuit) enables the messenger connection service server 200 to communicate with the messenger server 400 and the display device 100.

The memory 220 may include a multi-messenger controller 221 and a messenger connection manager 222.

The processor 230 may use the messenger connection manager 222 stored in the memory 220 to configure a messenger connection relationship between the display device 100 and the electronic device 300.

In addition, the processor 230 may use the multi-messenger controller 221 stored in the memory 220 to distinguish and process different message formats used by a plurality of messenger servers in order to connect the display device 100 to the plurality of messenger servers using the different types of message formats.

According to an embodiment, the processor 230 may receive, from the electronic device, a request for connection to the display device via a messenger application, identify a type of the messenger application used for the connection request, perform authentication of the electronic device 300 and the display device 100, and, when the authentication of the electronic device 300 and the display device 100 is completed, generate messenger connection information including messenger identification information indicating the identified type of messenger application, user identification information for identifying a user using the messenger application on the electronic device, and connected device identification information for identifying the display device, and perform, based on the generated messenger connection information, a messenger connection control between the electronic device and the display device.

According to an example embodiment, to perform the authentication of the electronic device and the display device, the processor 230 may receive, from the electronic device, via the messenger application, an authentication number generated by the display device and output on a screen of the display device, receive, from the display device, the authentication number generated by the display device, and determine whether the authentication number output from the display device matches the authentication number received from the electronic device.

According to an example embodiment, the processor 230 may receive a message to be delivered to the display device from the user for whom the messenger connection information is generated, process the received message based on messenger identification information corresponding to the message, and transmit the processed message to the display device.

The display device 100 is a device capable of displaying images or data according to a user's request, and may include a communication interface 110, a user interface 120, a display 130, a memory 140, and a processor 150.

The communication interface 110 (including, e.g., a communication interface circuit) may perform communication between the display device 100 and the messenger connection service server 200. The communication interface 110 may include one or more modules that enable wireless communication between the display device 100 and a wireless communication system or between the display device 100 and a network on which another electronic device is located. For example, the communication interface 110 may include a broadcast receiving module, a mobile communication module, a wireless Internet module, and/or a short-range communication module. The communication interface may be referred to as a transmitter/receiver or transceiver.

The broadcast receiving module receives broadcast signals and/or broadcast-related information from an external broadcast management server via a broadcast channel. The broadcast signals may include a TV broadcast signal, a radio broadcast signal, and a data broadcast signal, as well as a broadcast signal that is a combination of the TV broadcast signal or radio broadcast signal with the data broadcast signal.

The mobile communication module transmits or receives wireless signals to or from at least one of a base station, an external terminal, or a server on a mobile communication network. The wireless signals may include a voice call signal, a video call signal, or various forms of data according to transmission and reception of text/multimedia messages.

The wireless Internet module refers, for example, to a module for wireless Internet access, and may be built into or external to a device. As wireless Internet technologies, wireless local area network (WLAN) (WiFi), wireless broadband (Wibro), World Interoperability for Microwave Access (Wimax), high speed downlink packet access (HSDPA), etc. may be used. The display device 100 may establish a Wi-Fi peer-to-peer (P2P) connection with another device via the wireless Internet module.

According to an example embodiment, to perform authentication between the display device 100 and an external device 200, the wireless Internet module may perform a P2P connection with the external device.

The short-range communication module refers, for example, to a module for short-range communication. As short-range communication technologies, Bluetooth™, radio frequency identification (RFID), Infrared Data Association (IrDA), ultra-wideband (UWB), ZigBee, etc. may be used.

The user interface 120 may be any form of interface capable of receiving a user input. For example, the user interface 120 may be arranged on a portion of the display device 100 and include a manipulation button capable of receiving a user input, a light receiver capable of receiving an input from a remote control device, a touch input when the display is implemented as a touch sensitive display, a microphone for receiving a voice uttered by the user, etc.

The display 130 may output images or data processed by the display device 100.

The memory 140 may store programs necessary for processing or control by the processor 150, and store data input to or output from the display device 100.

The memory 140 may include at least one type of storage medium among a flash memory-type memory, a hard disk-type memory, a multimedia card micro-type memory, a card-type memory (e.g., an SD card or an XD memory), RAM, SRAM, ROM, EEPROM, PROM, a magnetic memory, a magnetic disc, and an optical disc.

The memory 140 may include a messenger connection manager 141 that manages a messenger connection, monitors and stores information about user behavior in a messenger connection mode to generate profile information.

The processor 150 controls all operations of the display device 100. For example, the processor 150 may execute one or more instructions stored in the memory 140 to perform functions of the display device 100 described in the present disclosure.

In an example embodiment of the present disclosure, the processor 150 may execute one or more instructions stored in the memory 140 to control or cause the above-described operations to be performed. In this case, the memory 140 may store one or more instructions executable by the processor 150.

Also, in an example embodiment of the present disclosure, the processor 150 may store one or more instructions in an internal memory provided therein and execute the one or more instructions stored in the internal memory to control or cause the above-described operations to be performed. In other words, the processor 150 may execute at least one instruction or program stored in the internal memory provided in the processor 150 or the memory 140 to perform specified operations.

According to an embodiment, the memory 140 may store programs necessary for processing or control by the processor 150, and store data input to or output from the display device 100. Furthermore, the memory 140 may store pieces of data necessary for operations of the display device 100.

Also, programs stored in the memory 140 may be categorized into a plurality of modules according to their functions.

The processor 150 performs functions of controlling all the operations of the display device 100 and a flow of signals between the internal components of the display device 100 and processing data. When there is an input by a user or preset and stored conditions are satisfied, the processor 150 may execute an operating system (OS) and various applications stored in the memory 140.

In addition, the processor 150 may include an internal memory. In this case, at least one of data, programs, or instructions stored in the memory 140 may be stored in the internal memory of the processor 150.

According to an example embodiment, the processor 150 may receive a message transmitted via a messenger system, identify messenger connection information corresponding to a user who transmitted the message and a type of a messenger application used for the message, obtain stored profile information corresponding to the identified messenger connection information, and respond to a message from the electronic device or control an operation of the display device based on the obtained profile information.

According to an example embodiment, the processor 150 may collect, based on the messenger connection information, information about user behavior performed on the display device or environment information regarding the display device, and generate the collected information about the user behavior or environment information as the profile information corresponding to the messenger connection information.

According to an embodiment, the processor 150 may obtain content information or advertisement information recommended based on the profile information corresponding to the messenger connection information regarding a user, and transmit a message guiding the recommended content information or advertisement information to the electronic device via the messenger application.

According to an example embodiment, the processor 150 may switch between a family mode indicating, for example, a state in which the display device is not messenger connected and a messenger connection mode indicating, for example, a state in which the display device is messenger connected to the user.

According to an example embodiment, the processor 150 may switch to a messenger connection mode corresponding to a user, in response to reception of a message from the user in the family mode in which the display device is not messenger connected or a state in which the display device is messenger connected to another user. For such switching, according to an example embodiment, the processor 150 may obtain messenger connection information regarding the user who transmitted the message, and control an operation of the display device based on profile information corresponding to the messenger connection information regarding the user.

According to an example embodiment, the processor 150 may control the display device to automatically execute an application included in the profile information according to the profile information corresponding to the messenger connection information regarding the user.

According to an example embodiment, in order to control the display device, the processor 150 perform an operation of controlling an environment of the display device based on environment settings information included in the profile information or perform automatic login to the application according to account login information included in the profile information.

According to an example embodiment, the processor 150 may switch to the family mode based on the messenger connection being released while the display device is operating in the messenger connection mode, and control the display device to change the environment of the display device based on default profile information corresponding to the family mode.

According to an example embodiment, in response to reception of a request to power off the display device while the display is operating in the messenger connection mode, the processor 150 may control the display device to maintain the messenger connection mode for a predetermined time and switch to the family mode after a lapse of the predetermined time.

According to an example embodiment, in response to reception of a content sharing request message from a user during playback of content in the messenger connection mode, the processor 150 may control generation of a chat room including metadata containing information about the played content, share the metadata about the generated chat room on a counterpart display device of a counterpart user with whom to share the content, and according to the sharing operation, display a multi-view including a content play window and a chat window corresponding to the chat room.

According to an example embodiment, the processor 150 may control a key used to access the chat room to be provided to a counterpart electronic device of the counterpart user with whom to share the content, receive, from the counterpart display device connected to the counterpart electronic device, a request to access the chat room using the key, and according to authentication of the key in response to the request to access the chat room, transmit the metadata about the chat room to the counterpart display device. The metadata about the chat room may include information about the content to be shared and address information for accessing the chat room.

The block diagram of the display device 100 is provided for illustration of an embodiment. Each of the components in the block diagram may be integrated, added, or omitted according to the specification of the display device 100 that is actually implemented. For example, two or more components may be combined into a single component, or a single component may be split into two or more components when necessary. Functions performed in each block are intended to describe embodiments, and a specific operation or device related to the functions does not limit the scope of the present disclosure.

Figure 3:
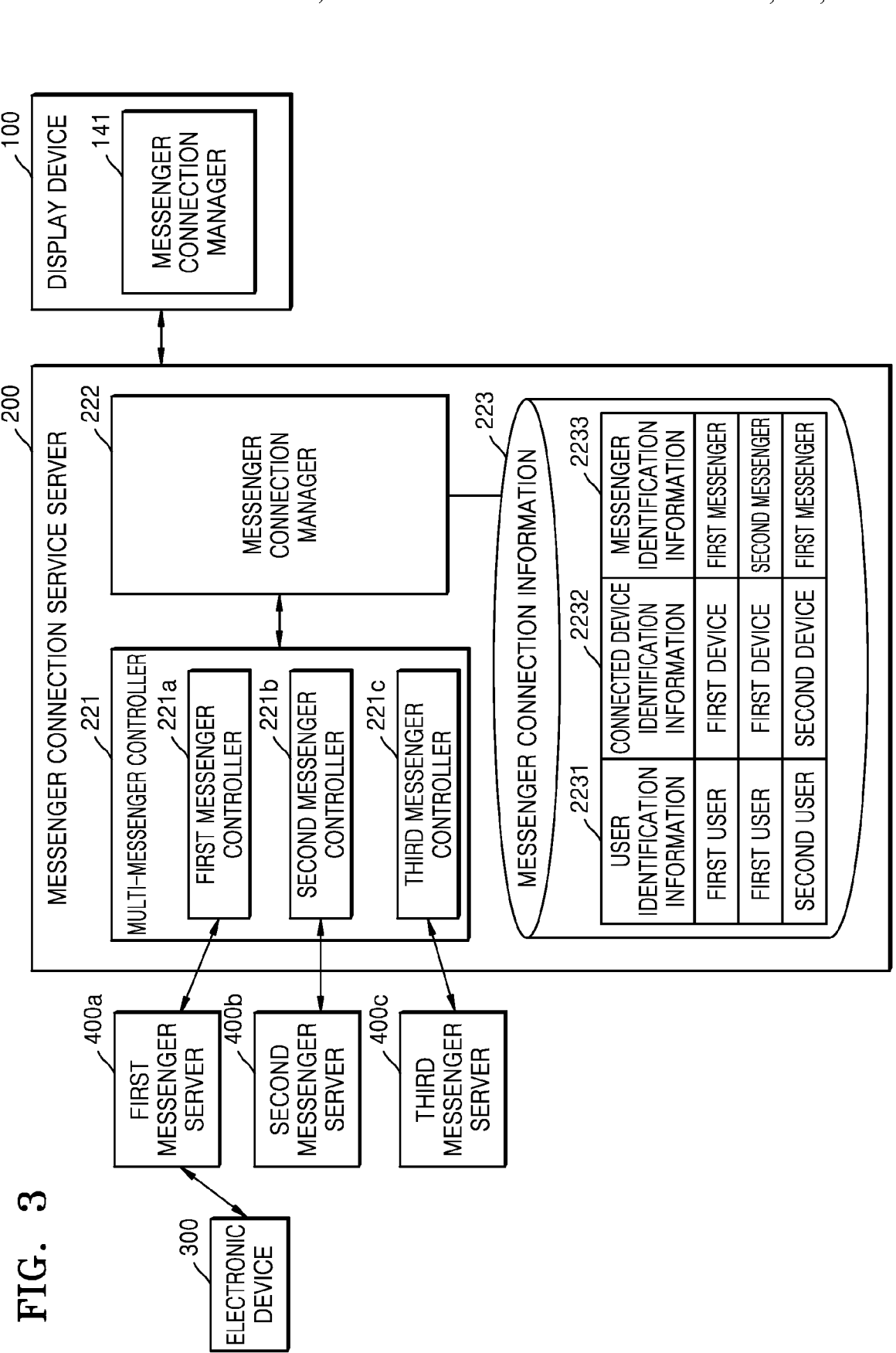
FIG. 3 is a block diagram illustrating functions of an example messenger connection service server according to various embodiments.

FIG. 3 is a block diagram illustrating functions of an example messenger connection service server according to various embodiments.

Referring to FIG. 3, a messenger connection service server 200 may include a multi-messenger controller 221, a messenger connection manager 222, and messenger connection information 223.

The multi-messenger controller 221 may separately process messages received from a plurality of messenger systems of different types in order to connect the different types of messenger systems to a display device 100.

Because social messenger systems may each transmit messages via its unique message format and message transmission path, the multi-messenger controller 221 may include a plurality of messenger controllers using a message format and a message transmission path corresponding to each social messenger system.

According to an embodiment, the multi-messenger controller 221 may include a first messenger controller 221a, a second messenger controller 221b, and a third messenger controller 221c. The first messenger controller 221a is designated to correspond to a first messenger server 400a to process a message format for the first messenger system used by a first messenger server 400a and transmit and receive messages via a message transmission path used by the first messenger server 400a. The second messenger controller 221b is designated to correspond to a second messenger server 400b to process a message format for a second messenger system used by the second messenger server 400b and transmit and receive messages via a message transmission path used by the second messenger server 400b. The third messenger controller 221c is designated to correspond to a third messenger server 400c to process a message format for a third messenger system used by the third messenger server 400c and transmit and receive messages via a message transmission path used by the first messenger server 400c. For example, when receiving a message from the second messenger server 400b, the second messenger controller 221b may process the received message and transmit it to the display device 100, and a message to be transmitted from the display device 100 to an electronic device 300 may be processed by the second messenger controller 221b and transmitted to the second messenger server 400b. Each messenger controller may store a message reception address (Uniform Resource Locator (URL)) of a corresponding messenger server, and transmit and receive messages to and from the corresponding messenger server using the message reception address. The message reception address may be in a form that can be transmitted via Internet communication (http, https, web socket, etc.).

The messenger connection manager 222 configures a messenger connection relationship between the electronic device 300 and the display device 100. For example, when the user of the electronic device 300 requests addition of a friend representing the display device 100 registered with the first messenger system, e.g., "Samsung TV Guide", as a friend, the messenger connection manager 222 may perform a specified operation for authenticating the electronic device 300 and the display device 100. When the messenger connection manager 222 performs a specified authentication procedure and the authentication is successfully completed, the messenger connection manager 222 may configure a messenger connection relationship between the electronic device 300 and the display device 100 via the first messenger system. The messenger connection manager 222 may not configure a messenger connection relationship when authentication is not successful.

The messenger connection manager 222 may store messenger connection information 223 including a messenger connection relationship between one or more electronic devices and one or more display devices. Also, the messenger connection manager 222 may transmit the generated messenger connection information 223 to the display device 100.

The messenger connection information 223 may include user identification information 2231, connected device identification information 2232, and messenger identification information 2233.

The user identification information 2231 is information for identifying a user connected to a device via a messenger connection. For example, in a case of a social messenger application based on account login, the user identification information 2231 may be information that may represent a specific user, such as a value representing a specific user account.

The connected device identification information 2232 is information for identifying a device connected to a user via a messenger connection, and may be, for example, address information of a device on a network or unique identification information indicating the device. For example, when there is a plurality of connected devices in a household, the connected device identification information 2232 may use information for distinguishing between the plurality of connected devices in the household. For example, when both a master room TV and a living room TV are used for a messenger connection in a household, the connected device identification information 2232 may distinguish between the master room TV and the living room TV.

The messenger identification information 2233 may indicate information for identifying a messenger used to connect a user and a device. To enable connection via various commercialized messenger systems, the messenger identification information 2233 may distinguish between a plurality of different messenger types.

Referring to an example configuration of the messenger connection information 223 shown in FIG. 3, a connection relationship is registered so that a first user may connect to a first device via both a first messenger a second messenger. In addition, a connection relationship is registered so that a second user may connect to the second device via the first messenger.

According to an example embodiment, the messenger connection manager 222 may transmit the generated messenger connection information to the display device 100 in order to share the messenger connection information with the display device 100.

According to an example embodiment, when a new messenger system needs to be registered, the messenger connection service server 200 may add a new messenger controller corresponding to the new messenger system and connect the new messenger system to the new messenger controller, thereby facilitating expansion of the service.

Figure 4:
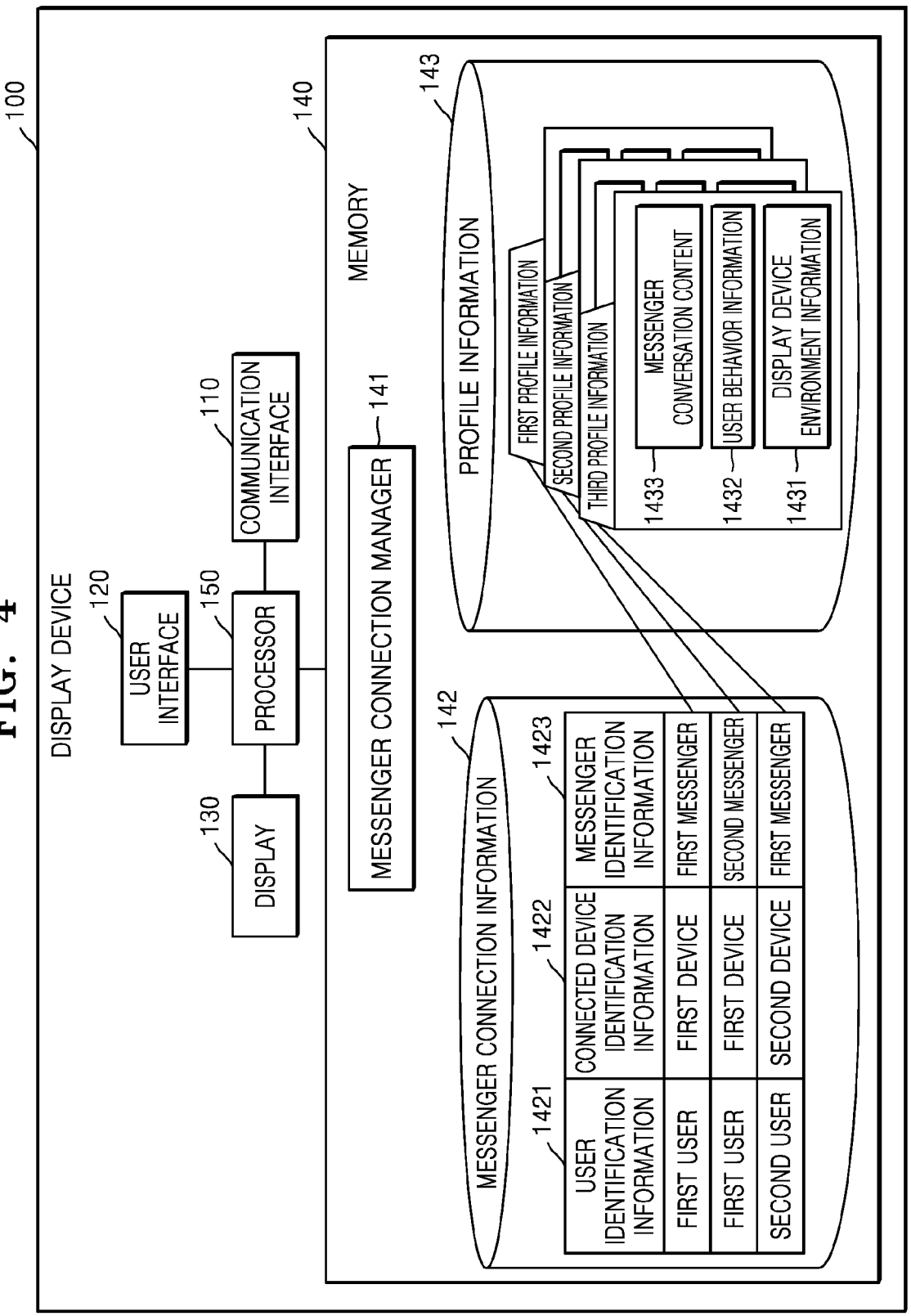
FIG. 4 is a block diagram illustrating a function of configuring a messenger connection-based user environment of an example display device, according to various embodiments.

FIG. 4 is a block diagram illustrating a function of configuring an example messenger connection-based user environment of the display device 100, according to various embodiments.

Referring to FIG. 4, the memory 140 of the display device 100 may include a messenger connection manager 141, messenger connection information 142, and profile information 143.

The messenger connection manager 141 may receive the messenger connection information 142 from the messenger connection service server 200 and store it in the memory 140. The messenger connection service server 200 may generate and store the messenger connection information 223 for connecting a plurality of electronic devices to a plurality of display devices. Also, the messenger connection manager 141 may receive from the messenger connection service server 200 and store the messenger connection information 142 related to the display device 100 itself.

The messenger connection manager 141 may collect behavior of a messenger connected user or an environment and store it as profile information 143 in order to provide a customized environment or information tailored to the messenger connected user.

Specifically, the messenger connection manager 141 may generate profile information corresponding to each user for each of one or more messenger connection relationship entries included in the messenger connection information 142. For example, the messenger connection manager 141 may configure first profile information for a first messenger connection relationship entry corresponding to a first user, a first device (i.e., the display device 100), and a first messenger, second profile information for a second messenger connection relationship entry corresponding to the first user, the first device, and a second messenger, and third profile information for a third messenger connection relationship entry corresponding to a second user, a second device, and the first messenger.

According to an example embodiment, the messenger connection manager 141 may include display device environment information 1431, user behavior information 1432, and messenger conversation message content 1433 in the profile information 143.

According to an example embodiment, the messenger connection manager 141 may include the display device environment information 1431 in the profile information 143. The display device environment information 1431 may include, for example, information obtained by a user messenger connected to the display device setting an environment of the display device while the display device 100 is messenger-connected to the user. For example, while messenger-connected to the display device using the first messenger, the first user may set an environment of the display device, for example, various environment variables of the display device, such as screen brightness, colors, sound, etc. The messenger connection manager 141 may thus store the display device environment information 1431, which is set by the first user while the first user is messenger-connected using the first messenger, as profile information corresponding to the messenger connection relationship entry including the first user and the first messenger. In this way, when the messenger connection manager 141 stores the display device environment information as profile information, the messenger connection manager 141 may control, when the first user later makes a messenger connection using the first messenger, the environment of the display device 100 using the display device environment information included in the profile information stored for the first user. For example, when the first user sets a screen brightness of the display device to A and the volume to B while messenger-connected to the display device using the first messenger, the display device 100 may control the screen brightness of the display device 100 to be A and the volume to be B when the first user later connects to the display device 100 via the first messenger.

According to an example embodiment, the messenger connection manager 141 may include the user behavior information 1432 in the profile information 143. The user behavior information 1432 may include, while the display device 100 is messenger-connected to a user, information input by the messenger-connected user to manipulate the display device, resultant information obtained due to the manipulation operation, etc.

For example, the user behavior information 1432 may include information about an application executed by the user, information about an account logged in to execute the application, information about content that the user searches for, selects, or plays in the application, etc. By storing the application account login information entered by the user in a messenger-connected state, when the user later attempts to execute the application while in the messenger-connected state, the messenger connection manager 141 may automatically perform an application login operation using the stored login information without asking for the account login information again. In addition, by accumulating information about content that the user has searched for or played, the messenger connection manager 141 may later recommend content or advertisements that may be appropriate for or preferred by the user while the user is in a messenger-connected state.

Alternatively, the messenger connection manager 141 may use the accumulated information to transmit a message to the user with personalized content or advertisements via a messenger system. Also, the messenger connection manager 141 may access a third party service provider to accumulate data in addition to information obtainable from the display device 100 itself in order to accumulate video consumption information related to streaming service content played on the display device 100.

Furthermore, the user behavior information 1432 may include information for configuring a home screen of the display device 100, which is set by the user. Also, the user behavior information 1432 may include not only login account information for an application executed by the user on the display device 100 but also login account information for a native application that performs home screen settings and the like for the display device 100. In this way, by storing the login account information for the native application as profile information, the messenger connection manager 141 may collectively change a display viewing environment using the login account information for the native application when the corresponding user is messenger-connected again later.

According to an example embodiment, the messenger connection manager 141 may include the messenger conversation content 1433 in the profile information 143. The messenger conversation contents 1433 may include, for example, message contents transmitted and received between a user and the display device 100 while the user is messenger-connected to the display device. These messenger conversation contents 1433 may be referred to when the messenger connection manager 141 analyzes what topics the user is interested in and the like.

According to an example embodiment, the messenger connection manager 141 may further include voice command interpreter settings information in the profile information 143. The voice command interpreter settings information may include, when a voice message is received from a user while the display device is messenger-connected to the user, information indicating a voice command interpreter used to interpret the received voice message.

Figure 5:
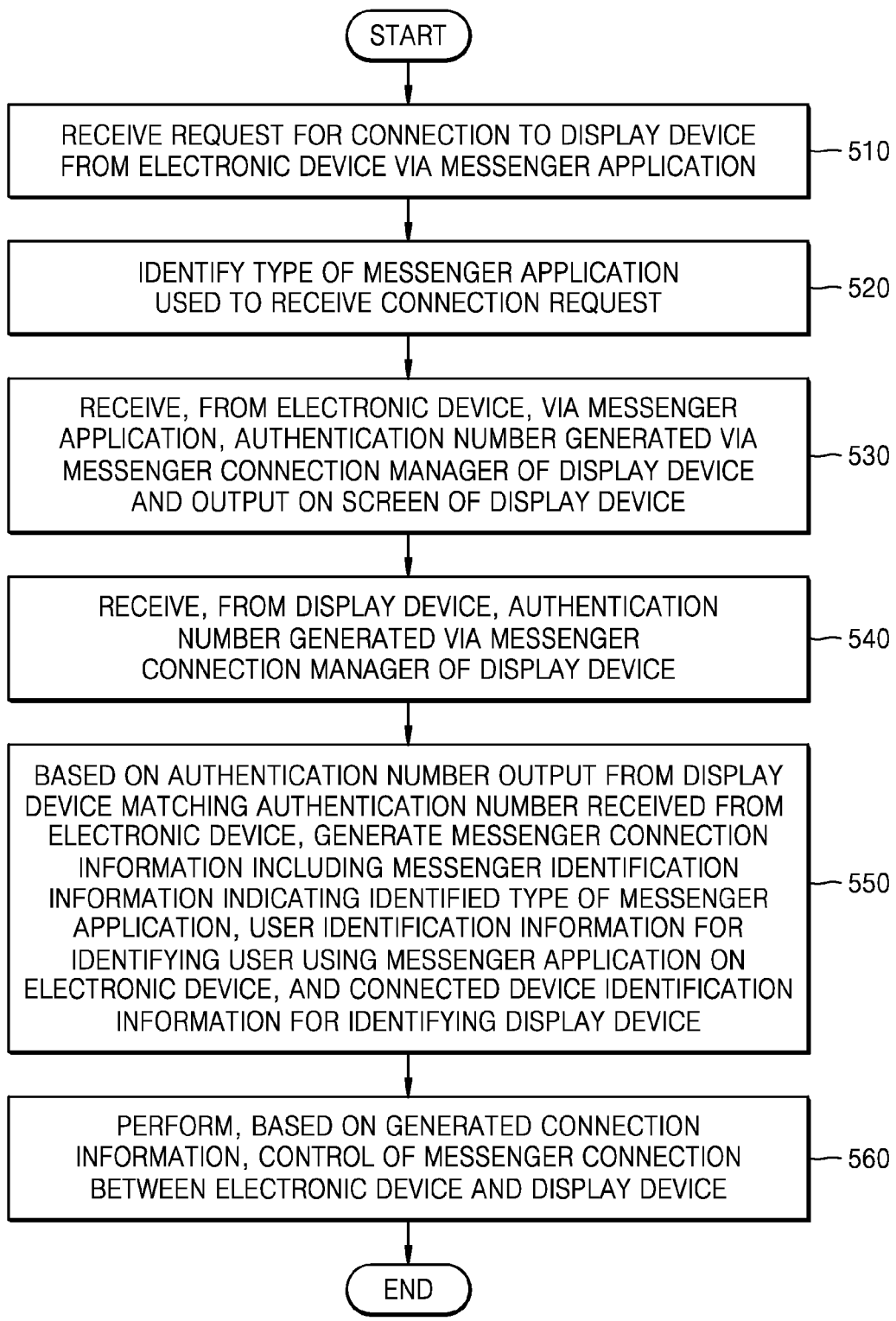
FIG. 5 is a flowchart illustrating an example of a process of a method, performed by a messenger connection service server, of generating connection information indicating a connection relationship between an electronic device and a display device, according to various embodiments.

FIG. 5 is a flowchart illustrating an example method, performed by a messenger connection service server, of generating connection information indicating a connection relationship between an electronic device and a display device, according to various embodiments.

Referring to FIG. 5, in operation 510, the messenger connection service server may receive a request for a messenger connection to the display device from the electronic device via a messenger application.

In operation 520, the messenger connection service server may identify a type of the messenger application used for the messenger connection request.

In operation 530, the messenger connection service server may receive, from the electronic device, via the messenger application, an authentication number generated via a messenger connection manager of the display device and output on a screen of the display device.

In operation 540, the messenger connection service server may receive, from the display device, an authentication number generated via the messenger connection manager of the display device.

In operation 550, based on the authentication number output from the display device matching an authentication number received from the electronic device, the messenger connection service server may generate messenger connection information including messenger identification information indicating the identified type of messenger application, user identification information for identifying a user using the messenger application on the electronic device, and device identification information for identifying the display device.

In operation 560, the messenger connection service server may perform, based on the generated messenger connection information, a messenger conversation control between the electronic device and the display device.

Figure 6:
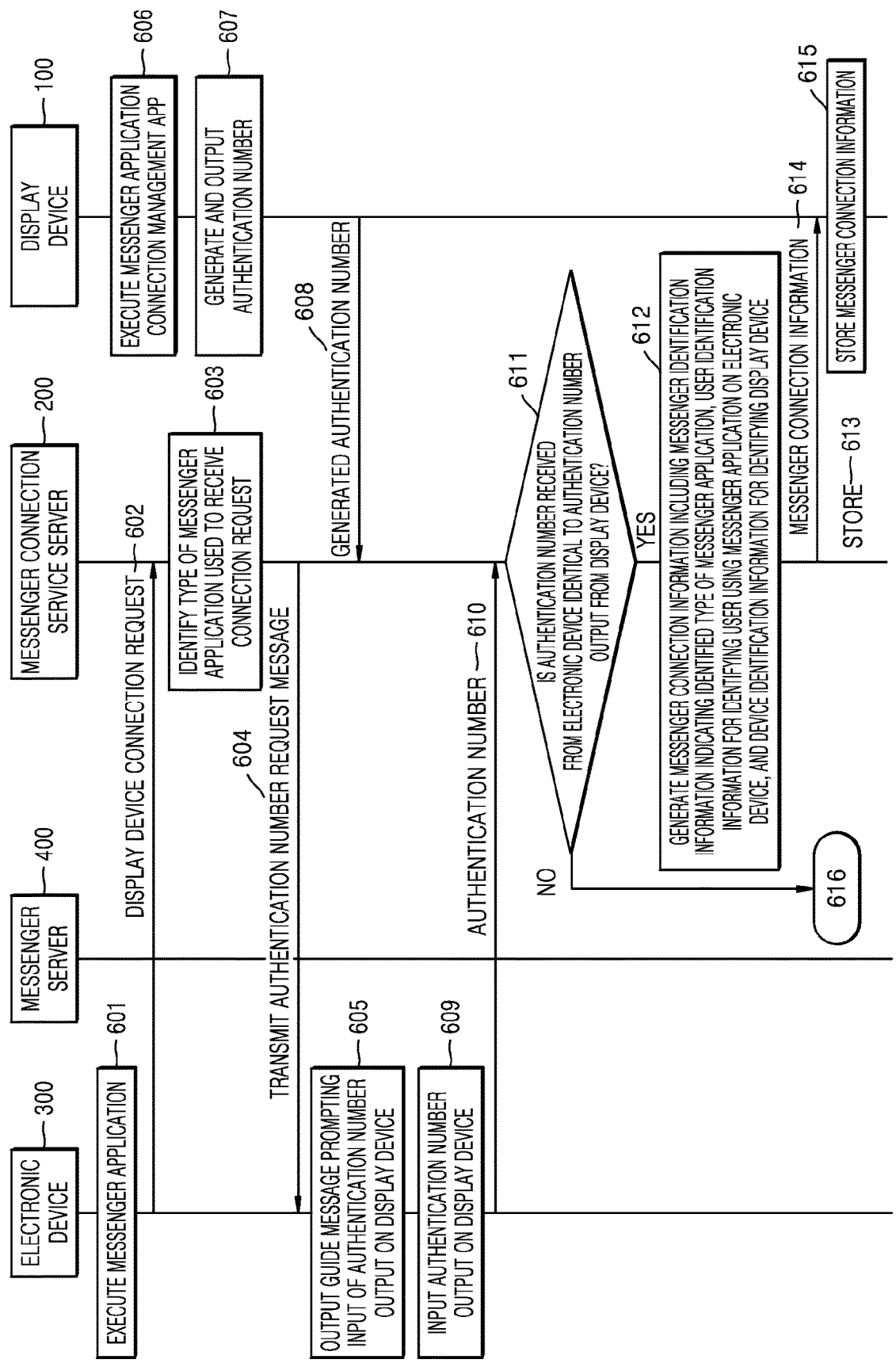
FIG. 6 is a flowchart illustrating an example of a process of a method, performed by a messenger connection service server, of generating connection information indicating a connection relationship between an electronic device and a display device, according to various embodiments.

FIG. 6 is a flowchart illustrating an example method, performed by a messenger connection service server, of generating messenger connection information indicating a connection relationship between an electronic device and a display device, according to various embodiments.

Referring to FIG. 6, in operation 601, the electronic device 300 may execute a messenger application. For example, a user of the electronic device 300 may execute one desired application from among one or more messenger applications installed on the electronic device 300.

In operation 602, the electronic device 300 may transmit a display device connection request to the messenger connection service server 200 via the executed messenger application, i.e., via the messenger server 400. The messenger server 400 may include the display device 100 among counterpart entities to which the electronic device 300 is connectable, and the user of the electronic device 300 may request a connection to the display device by selecting the display device 100 from among the connectable counterpart entities.

In operation 603, when receiving the display device connection request, the messenger connection service server 200 may identify a type of messenger application used for the connection request. Because the messenger connection service server 200 includes a multi-messenger controller system to respond to requests from one or more different messenger systems, when there is a request from a specified messenger system using the multi-messenger controller system, the messenger connection service server 200 may identify which messenger system has transmitted the request.

In operation 604, the messenger connection service server 200 may transmit an authentication number request message to the electronic device 300 via the messenger server 400.

In operation 605, the electronic device 300 may output a guide message prompting input of an authentication number output on the display device.

Moreover, a user who desires to connect the electronic device 300 to the display device 100 using the messenger system may also perform, on the display device 100, manipulations for connecting the electronic device 300 to the display device 100.

In operation 606, the display device 100 may execute a messenger application connection management application. For example, the user of the display device 100 may execute the messenger application connection management application installed on the display device 100 and select a type of a messenger used for connection between the electronic device 300 and the display device 100.

In operation 607, in response to receiving a selection of a type of a messenger used for connection between the electronic device 300 and the display device 100, the display device 100 may generate an authentication number corresponding to the selected type of messenger and output the authentication number onto a display of the display device 100.

In operation 608, the display device 100 may transmit the authentication number generated in this way to the messenger connection service server 200. According to an example, the display device 100 may transmit, to the messenger connection service server 200, information about the type of messenger selected by the user, as well as the generated authentication number.

In operation 609, the electronic device 300 may receive an input of the authentication number output on the display device. In other words, the user of the electronic device 300 may input the authentication number output on a screen of the display device 100 to which the user desires to connect, according to the guide message prompting input of the displayed authentication number in operation 605.

Figure 7:
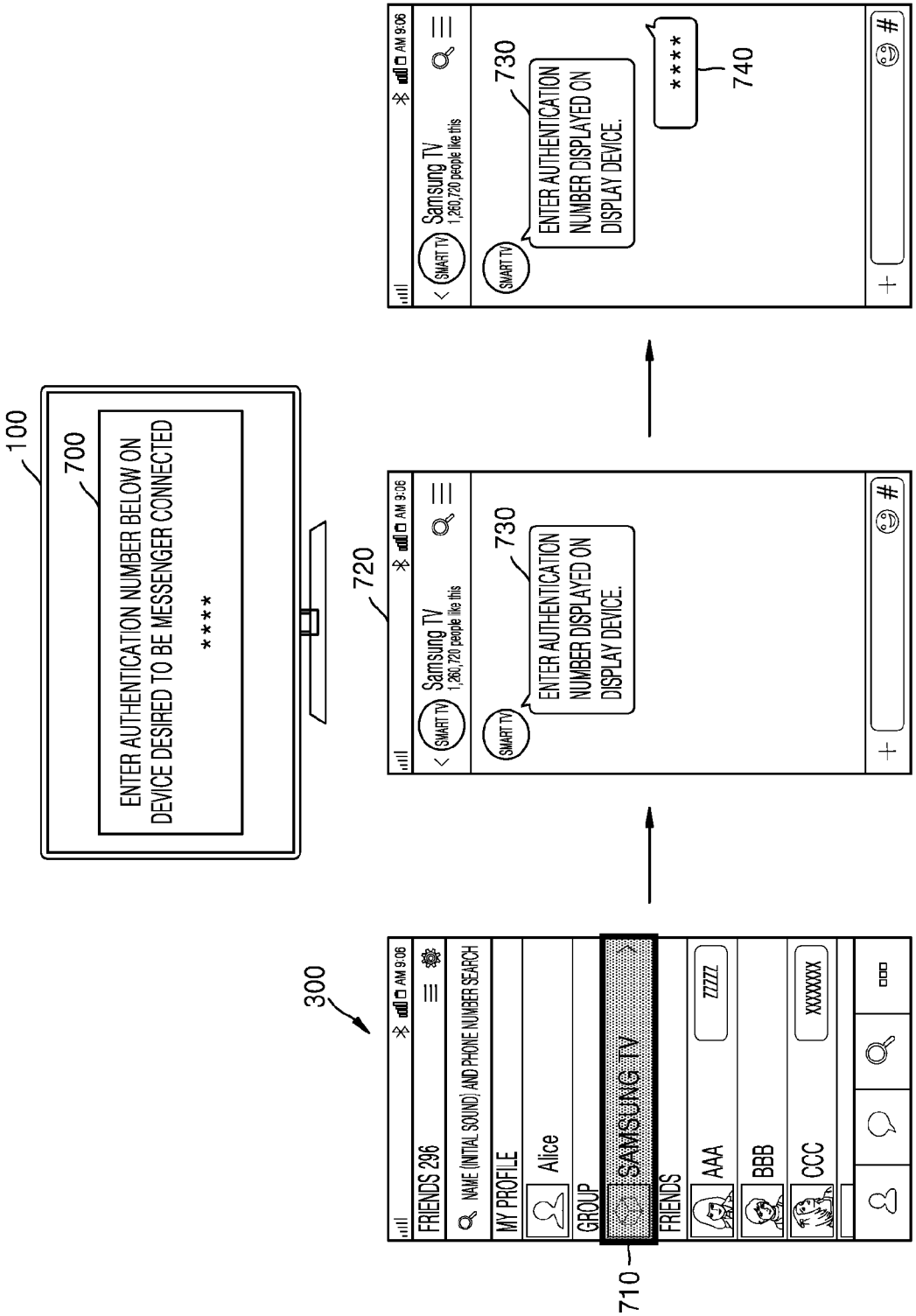
FIG. 7 illustrates an example of a user interface on an electronic device requesting a connection by selecting a Samsung TV as an example of a display device on the electronic device, according to various embodiments.

FIG. 7 illustrates an example user interface on an electronic device 300 requesting a connection by selecting a Samsung TV on the electronic device 300 as an example of a display device, according to various embodiments.

Referring to FIG. 7, a user may execute, for example, a first messenger application among one or more messenger applications installed on the electronic device 300, and search for a display device, e.g., a listing 710 for a Samsung TV, registered with a first messenger system via a friend search function in the first messenger application. When the user adds the Samsung TV as a friend through a name search, etc., a message transfer window for conversing with the Samsung TV may be displayed on the electronic device 300. A guide message 730 from the Samsung TV, prompting input of an authentication number, may be displayed in the message transfer window 720. The guide message 730 may be in the form of, for example, "Enter authentication number displayed on display device". The user who desires to connect the electronic device 300 to the display device via a first messenger that is a specific messenger application may execute a messenger connection manager installed on the display device 100 desired to be connected, and select the first messenger as the messenger application to be connected with the display device 100. Upon the user's selection, the display device 100 may generate an authentication number, e.g., a personal information number (PIN) code, used for authentication for messenger connection with the electronic device 300, and output a message 700 informing the user of authentication number "**". The user may check the authentication number displayed on the display device 100, and input the authentication number "**" 740 displayed on the display device 100 to the first messenger of the electronic device 300.

In operation 610, the electronic device 300 may transmit the authentication number input by the user to the messenger connection service server 200 via the messenger server 400.

In operation 611, by determining whether the authentication number input to the electronic device 300 is identical to the authentication number received from the display device 100, the messenger connection service server 200 may check whether the electronic device 300 is the entity requesting the messenger connection and whether the display device 100 is the target device to which the electronic device 300 desires to connect. When the authentication number received from the electronic device 300 is not identical to the authentication number received from the display device 100, the messenger connection service server 200 may determine that the authentication has failed and perform operation 616 to reconfirm authentication again. For example, because the authentication has failed, the messenger connection service server 200 may transmit, to the electronic device 300, a message prompting the user to re-enter an authentication number. When an authentication number received from the electronic device 300 is identical to the authentication number received from the display device 100, the messenger connection service server 200 may perform operation 612.

In operation 612, the messenger connection service server 200 may determine that the electronic device 300 and the display device 100 to be connected are authenticated, and generate messenger connection information for messenger connection between the electronic device 300 and the display device 100. According to an embodiment, the messenger connection service server 200 may generate connection information including, for example, user identification information for identifying a user using a messenger application on the electronic device, device identification information for identifying the display device used for a messenger connection, and messenger identification information indicating the identified type of messenger application. The messenger connection information 223 representing the messenger connection between the electronic device and the display device may include the user identification information 2231, the device identification information 2232, and the messenger identification information 2233, as shown in FIG. 3.

The user identification information 2231 may indicate information for identifying a user using the electronic device in the messenger connection. For example, a messenger application using account logins may provide information that can represent a specific user, such as a non-overlapping hash value representing an account, and this hash value may be used as a value for identifying the user. For example, a value, such as a user ID, generated by a social messenger system to represent a channel, page, or friend (a value generated using non-overlapping numbers or letters or a combination of both) may be used for user identification information 810 to identify the user.

The device identification information 2232 may indicate information for identifying a display device to be connected to the electronic device in the messenger connection. When receiving the authentication number from the display device, the messenger connection service server 200 may obtain identification information about the display device transmitting the authentication number as well as the authentication number, and generate device identification information 820 based on the identification information about the display device obtained in this way. The device identification information 820 may include a non-overlapping hash value.

The messenger identification information 2233 may indicate information for identifying a messenger used for a messenger connection between the electronic device and the display device. Because one or more messenger connections may be possible between a specific electronic device and a specific display device, messenger identification information may be required to determine a message path, i.e., which messenger should be used to transmit a message. For example, because there are commercialized messenger systems such as KakaoTalk Messenger, Facebook Messenger, and Line Messenger, messenger identification information 830 is information for identifying which of these commercialized messenger systems is used for a messenger connection between the electronic device and the display device.

In operation 613, the messenger connection service server 200 may store the generated messenger connection information in the memory.

In operation 614, the messenger connection service server 200 may transmit the generated messenger connection information to the display device 100.

In operation 615, when receiving the messenger connection information from the messenger connection service server 200, the display device 100 may store the messenger connection information.

Figure 8:
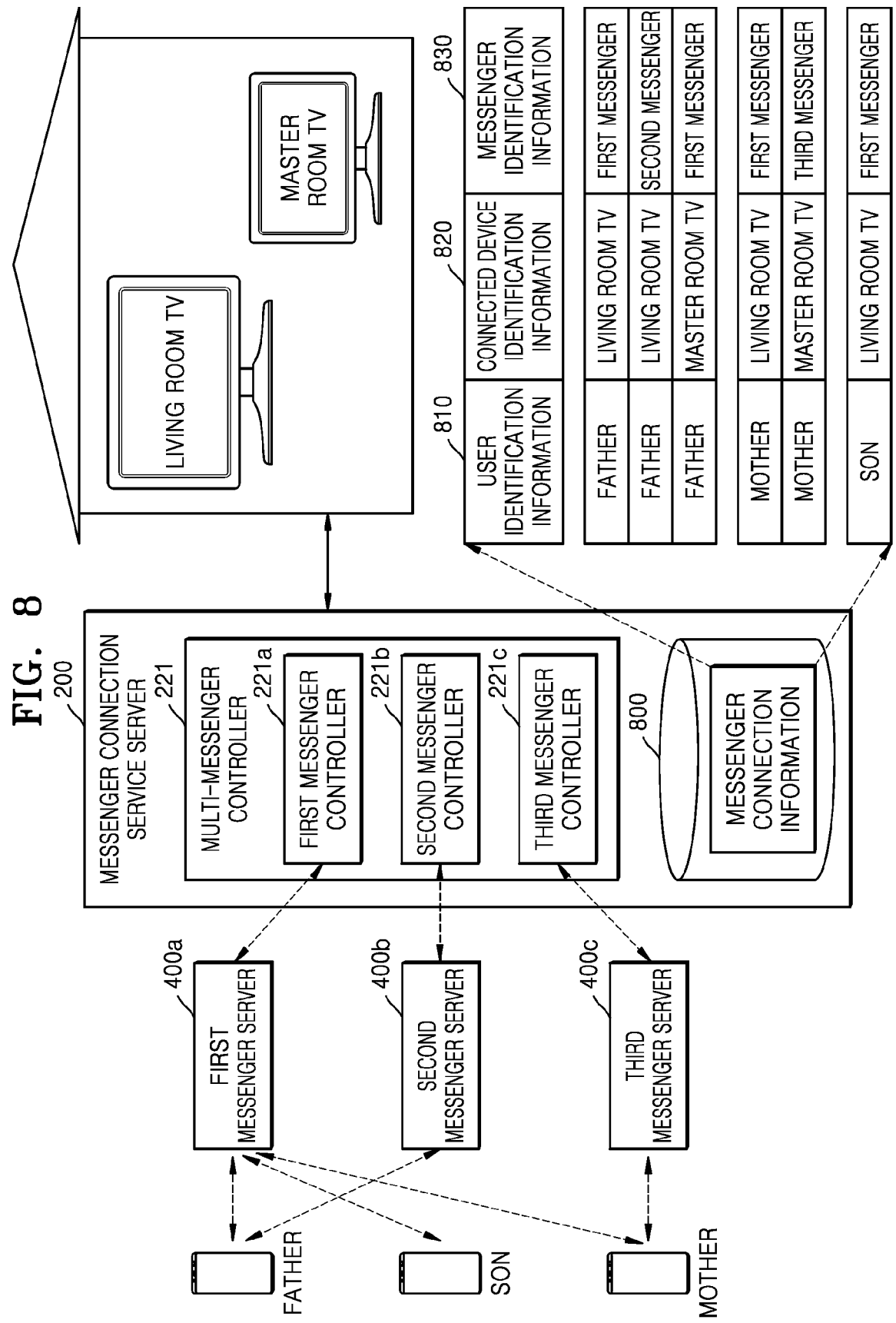
FIG. 8 illustrates an example in which connection information for an example messenger connection is generated for each of a plurality of users in a household, according to various embodiments.

FIG. 8 illustrates an example in which connection information for a messenger connection is generated for each of a plurality of users in a household, according to various embodiments.

Referring to FIG. 8, a father who is a family member may request a connection between the father's smartphone and a living room TV using a first messenger system operated by a first messenger server 400a. The messenger connection service server 200 may include a first messenger controller capable of processing message transmission and reception with a first messenger system, and the messenger connection service server 200 may generate messenger connection information for connecting the father to the living room TV via the first messenger system. Also, the father may request a connection between the father's smartphone and the living room TV using a second messenger system operated by a second messenger server 400b, and accordingly, the messenger connection service server 200 may generate messenger connection information for connecting the father to the living room TV via a second messenger. In addition, the father may request a connection between the father's smartphone and a master room TV using the first messenger system operated by the first messenger server 400a, and accordingly, the messenger connection service server 200 may generate messenger connection information for connecting the father to the master room TV via a first messenger.

In this way, the messenger connection service server 200 may also generate connection information for a son and a mother to create messenger connection information as shown in FIG. 8.

Referring to FIG. 8, messenger connection information 800 according to an example includes three entries representing connection information about the father, two entries representing connection information about the mother, and one entry representing connection information about the son. For example, an entry indicating connection to the living room TV via the first messenger, an entry indicating connection to the living room TV via the second messenger, and an entry indicating connection to the master room TV via the first messenger are created for the father, an entry indicating connection to the living room TV via the first messenger and an entry indicating connection to the master room TV via the third messenger are created for the mother, and an entry indicating connection to the living room TV via the first messenger is created for the son. In this way, when there are a plurality of TVs in a house, each TV may be managed with a separate messenger friend name, and a messenger connection may be created for each TV.

Figure 9:
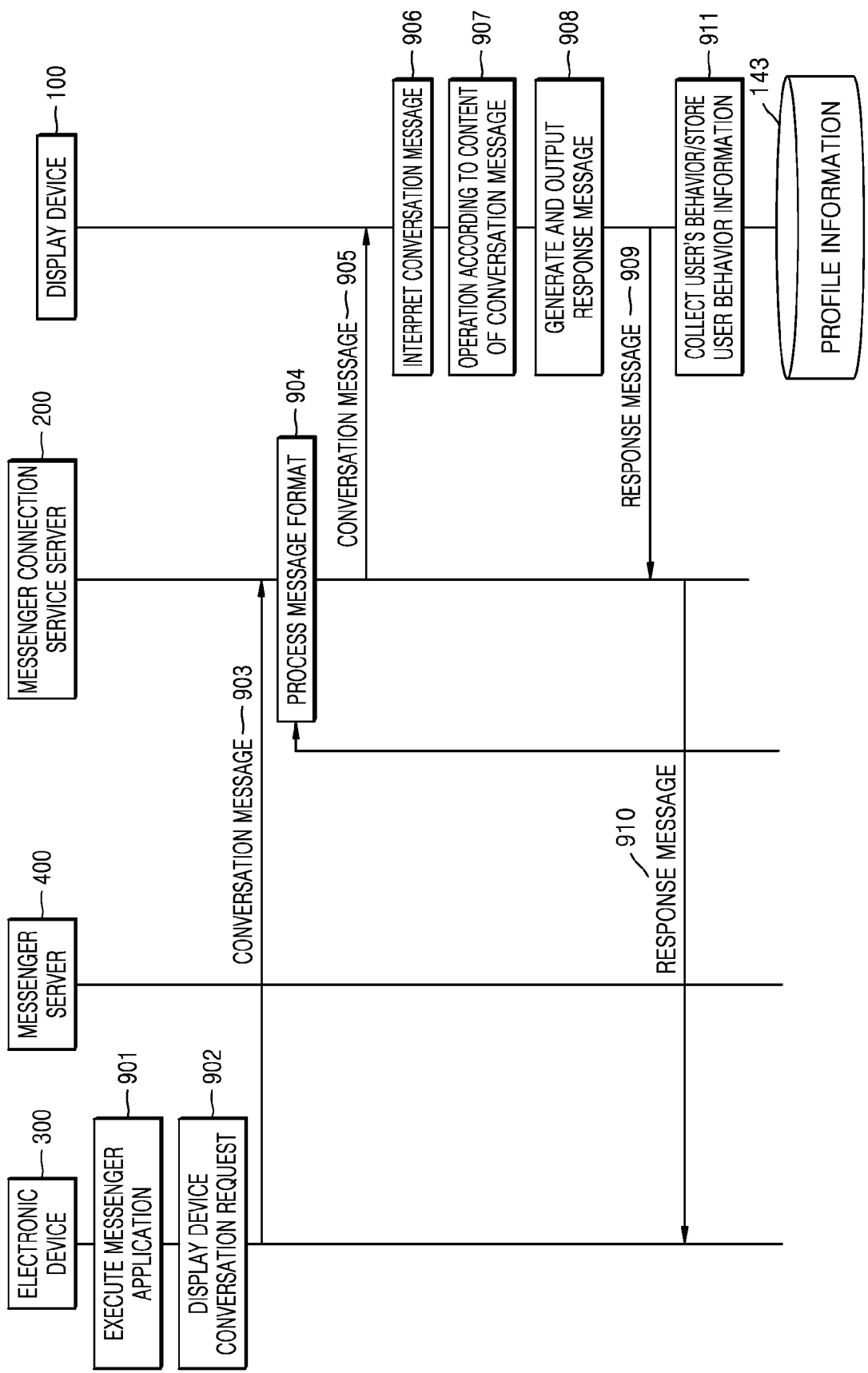
FIG. 9 is a flowchart for describing an example process of a method of collecting information about a user's behavior after establishing a messenger connection between an electronic device and a display device, according to various embodiments.

FIG. 9 is a flowchart for describing an example method of collecting information about a user's behavior after establishing a messenger connection between an electronic device and a display device, according to various embodiments.

Referring to FIG. 9, in operation 901, the electronic device 300 may execute a messenger application.

In operation 902, a user's display device conversation request may be received via the messenger application executed by the electronic device 300.

In operation 903, a conversation message in response to the display device conversation request from electronic device 300 may be transmitted to the messenger connection service server 200 via the messenger server 400.

In operation 904, the messenger connection service server 200 may receive the conversation message from the user of the electronic device 300 via the messenger server 400, and process a message format used by a type of a messenger, i.e., a corresponding messenger system, used by the messenger server 400 that transmitted the conversation message. For example, a multi-messenger controller of the messenger connection service server 200 may process the message according to a received message format.

In operation 905, the messenger connection service server 200 may transmit the conversation message in the processed message format to the display device 100.

In operation 906, when receiving the conversation message, the display device 100 may interpret the received conversation message.

In operation 907, the display device 100 may perform an operation according to interpretation of content of the conversation message. For example, when the content of the conversation message is <Turn up the volume>, the display device 100 may perform an operation of increasing a volume of a speaker of the display device based on interpretation of the content of the conversation message. For example, when the content of the conversation message is <Launch YouTube>, the display device 100 may perform an operation of executing the YouTube application.

In operation 908, the display device 100 may selectively generate a response message corresponding to the conversation message when necessary. When the conversation message is in the form of a message requesting a response, or when it is difficult to perform an operation corresponding to the content of the conversation message because supplementary explanation needs to be provided, the display device 100 may generate a response message in response to the conversation content. For example, when the content of the conversation message is, e.g., <Recommend a program to watch on Friday>, the display device 100 may generate a response message including information about one or more recommended programs in order to respond thereto.

In operation 909, the display device 100 may transmit the generated response message to the messenger connection service server 200.

In operation 910, the messenger connection service server 200 may transmit the response message to the electronic device 300 via the messenger server 400 by using a messenger system used for messenger conversation. The multi-messenger controller of the messenger connection service server 200 may process the response message according to a used messenger format and transmit the processed response message to the electronic device 300 via the messenger server 400.

In operation 911, the display device 100 may collect information about a user's behavior performed on the display device 100 while in the messenger connected state and store the collected user behavior information. The display device 100 may store profile information including user behavior information in association with messenger connection information.

The user behavior information collected by the display device 100 in the messenger connected state may be, for example, any information obtained based on the user manipulating the display device 100 after the user and the display device 100 establish a messenger connection therebetween. For example, the user behavior information may include information about content watched by the user, user profile information set on a content providing service server such as Netflix® or YouTube®, login connection information for a TV application user logged in based on an account, information about a user's search for a display device, environment settings information obtained by the user setting an environment of the display device, etc. The information about the content watched by the user may include identification information about the content watched by the user, genre information regarding the content watched by the user, category information regarding the content watched by the user, viewing time information regarding the content watched by the user, etc. The user profile information set on the content providing service such as Netflix or YouTube may include login information including a user ID and a password for accessing each content providing service, content providing service subscription information, or the like. The environment settings information obtained by the user setting the environment of the display device is information obtained by the user setting the environment of his or her display device, and may include, for example, information about screen brightness, volume, user interface layout, etc. In addition, the user behavior information may include messages transmitted and received using a connected messenger system.

According to an example embodiment, the display device 100 may collectively change the environment of the display device 100 to a personalized environment using such user behavior information when the user switches to a messenger connection mode.

According to an embodiment, the display device 100 may receive, from a streaming server or a third party server, relevant content that may be provided to each user on Netflix or YouTube, using such user behavior information.

When a content recommendation service is provided for each streaming service, content recommendation information is transmitted to the display device 100, and the personalized information is all different for each user profile in each streaming service. Because the display device 100 has each user profile information in messenger connection information, it may selectively transmit content information to each of users already connected to the display device.

According to an example embodiment, the display device 100 may analyze a user's preferences using such user behavior information, and actively recommend content or an advertisement suitable for the analyzed user's preferences to the user. For example, the display device 100 may transmit a message containing recommended content or advertisement content to the user via a messenger system based on the connection information.

Figure 10:
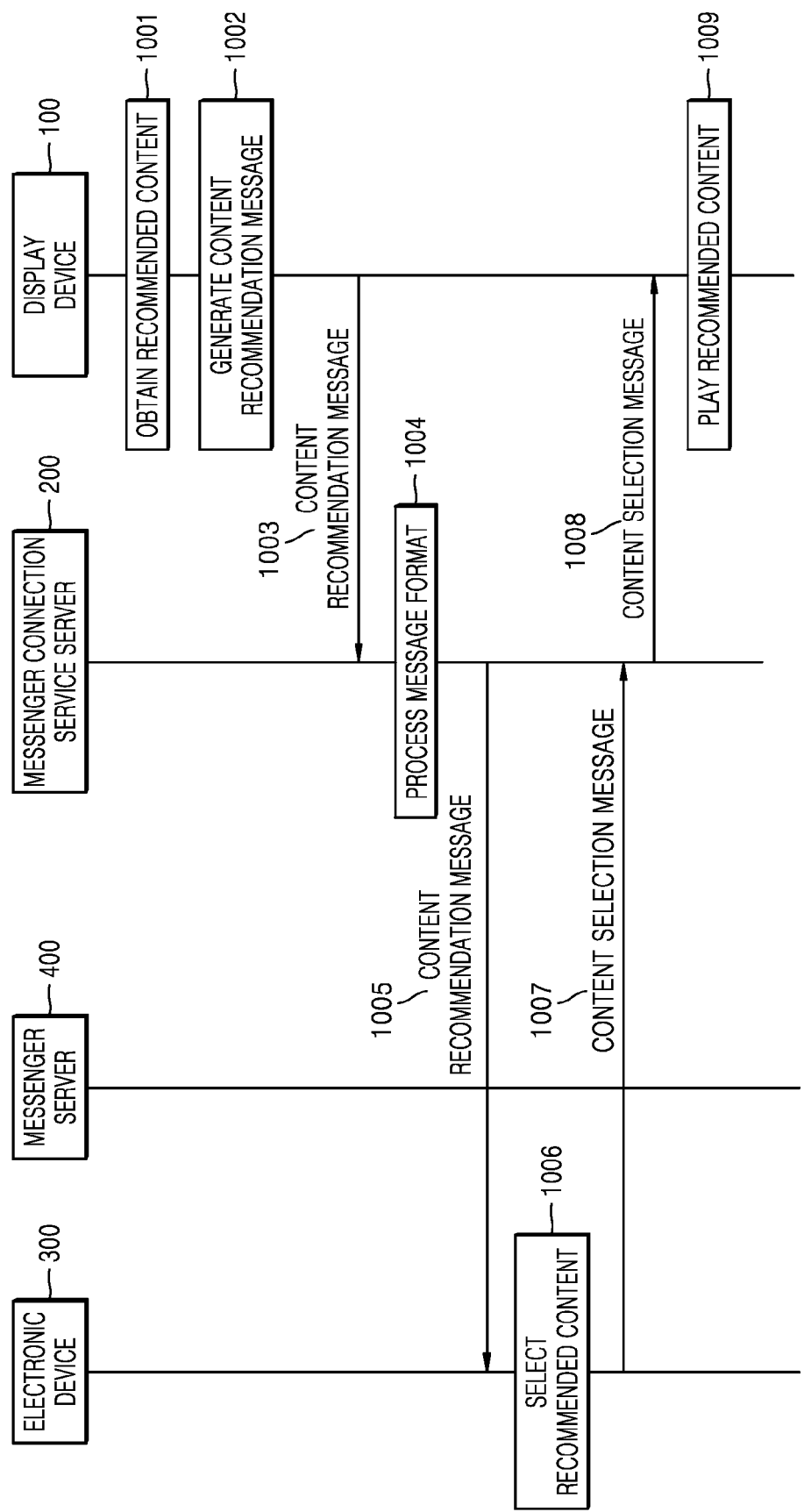
FIG. 10 is a flowchart for describing an example process of a method, performed by a display device, of actively transmitting a recommendation message to a user, according to various embodiments.

FIG. 10 is a flowchart for describing an example method, performed by a display device, of actively transmitting a recommendation message to a user, according to various embodiments.

Referring to FIG. 10, in operation 1001, the display device 100 may obtain recommended content. The display device 100 may discover recommended content suitable for a user while monitoring content based on messenger connection information stored in the display device. According to an embodiment, the display device 100 may receive recommended content from a third party server connected to the display device 100. For example, servers such as Netflix or YouTube may recommend content based on user profiles, and the display device may obtain recommended content from the servers such as Netflix or YouTube. According to an embodiment, the display device 100 may obtain recommended content through streaming-based video content information that may be provided by the display device 100 itself.

In operation 1002, the display device 100 may generate a content recommendation message recommending the obtained recommended content.

In operation 1003, the display device 100 may transmit the generated content recommendation message to the messenger connection service server 200.

In operation 1004, when receiving the content recommendation message, the messenger connection service server 200 may refer to connection information about the user receiving the content recommendation message to check corresponding messenger identification information and process a format of the content recommendation message so that the content recommendation message may be transmitted using a messenger system identified by the messenger identification information.

In operation 1005, the messenger connection service server 200 may transmit the content recommendation message to the electronic device 300 via the messenger server 400.

In operation 1006, the electronic device 100 may select the recommended content from the received content recommendation message. The content recommendation message may include, for example, execution link information that enables playback of content on the display device, so that when the user selects the execution link information, the display device may display a screen for viewing the content.

In operation 1007, the electronic device 100 may transmit a content selection message to the messenger connection service server 200 via the messenger server 400.

In operation 1008, the messenger connection service server 200 may transmit the content selection message to the display device 100.

In operation 1009, when receiving the content selection message, the display device 100 may parse the received content selection message and control the selected recommended content to be played accordingly.

Figure 11:
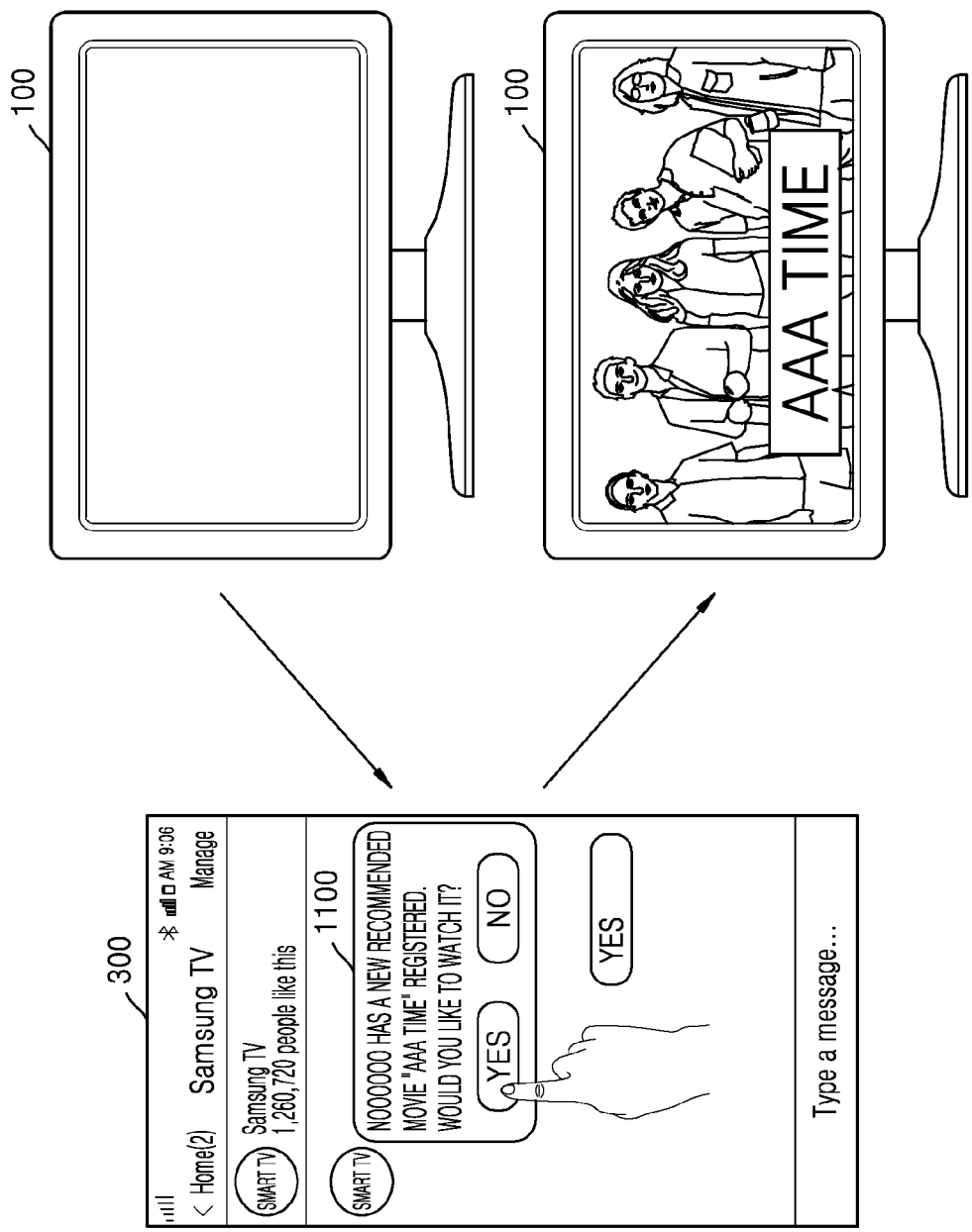
FIG. 11 is a diagram for explaining an example of a content recommendation message that may be provided by a display device, according to various embodiments.

FIG. 11 is a diagram for explaining an example content recommendation message that may be provided by a display device, according to various embodiments.

Referring to FIG. 11, the display device 100 may obtain recommended content that may be appropriate for user A based on profile information collected for the user A. For example, when it is determined that user A views or likes a thriller genre a lot among contents provided by N content service server, the N content service server may provide new content in the thriller genre as recommended content for the user A when the new content is added on the display device 100. When obtaining content that may be recommended to the user A in this manner, the display device 100 may generate and transmit a message recommending the recommended content to the user A. For example, as shown in FIG. 11, the display device 100 may transmit, to the user A, a content recommendation message 1100, such as <Noooooo has a new recommended movie "AAA Time" registered. Would you like to watch it?>, using a messenger registered in the user A's messenger connection information. In this way, the user may receive content recommendation information that may be provided by the display device using a messenger system he/she usually uses on his/her smartphone.

Because <YES> included in the content recommendation message is connected to a content execution link, when the user selects <YES> included in the content recommendation message, the display device 100 may control the corresponding recommended content to be immediately played according to the content execution link connected to <YES>.

Figure 12:
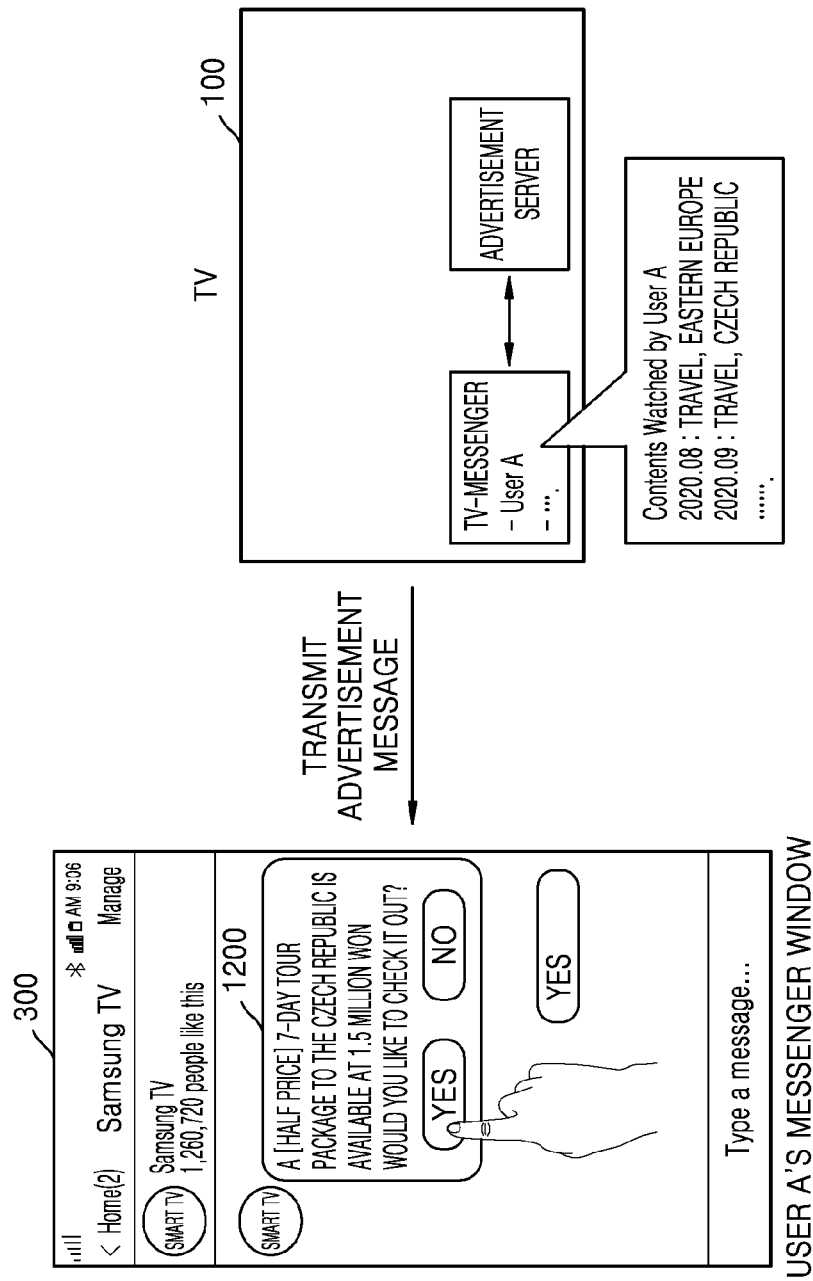
FIG. 12 is a diagram for explaining an example of a content recommendation message that may be provided by a display device, according to various embodiments.

FIG. 12 is a diagram for explaining an example content recommendation message that may be provided by a display device, according to various embodiments.

According to an embodiment, the display device 100 may provide a customized advertisement by analyzing viewing information collected in a messenger connection mode. For example, when user A has been watching a lot of travel content lately, the display device 100 may determine that the user A is much interested in travel. For example, when the user A watched content related to traveling to Eastern Europe in December 2020 and content related to traveling to the Czech Republic in January 2021, the display device 100 may determine that the user A is much interested in traveling to the Czech Republic or Eastern Europe. Therefore, the display device 100 may provide a message about a travel product that may be recommended to the user A, based on content provided from an advertisement server. For example, the display device 100 may transmit, to the user A, an advertisement message 1200 <A [half price] 7-day tour package to the Czech Republic is available at 1.5 million won. Would you like to check it out?> using a user A's connected messenger system. Because <YES> in the advertisement message transmitted to the user may be linked to an execution screen of the corresponding advertising content, when the user selects <YES> in the advertisement message, the display device may provide the execution screen of the advertising content linked to <YES>. In this way, the user may conveniently receive advertisement information that may be provided by the display device using a messenger system he or she usually uses on his/her smart phone.

According to an example embodiment, the display device may operate in two distinct status modes, a family (default) mode and a messenger connection mode.

The family (default) mode may, for example, refer to a state in which the display device is not connected to a messenger and thus does not provide a personalized service. In general, the display device may use network connections and user accounts to install various applications and log in to an account for each application to receive services associated with a corresponding application. When the display device is being used as a shared family device for family members to watch together, the display device may always remain logged in to the same account unless it is logged out of the account for an application. For this reason, parental locks are set to prevent children from watching adult content channels, or a password and the like are used to prevent a channel or application from running. However, this method may lead to inconvenience of adults having to separately enter a password for watching.

The messenger connection mode may, for example, refer to a state in which the display device is connected to an electronic device such as a smart device by using a messenger system. For a user whose messenger connection information is registered, because the user may be identified based on the messenger connection information and profile information about the user may be registered in association with the messenger connection information, the display device may personalize the display device itself or provide customized services to the user using the messenger connection mode.

Figure 13:
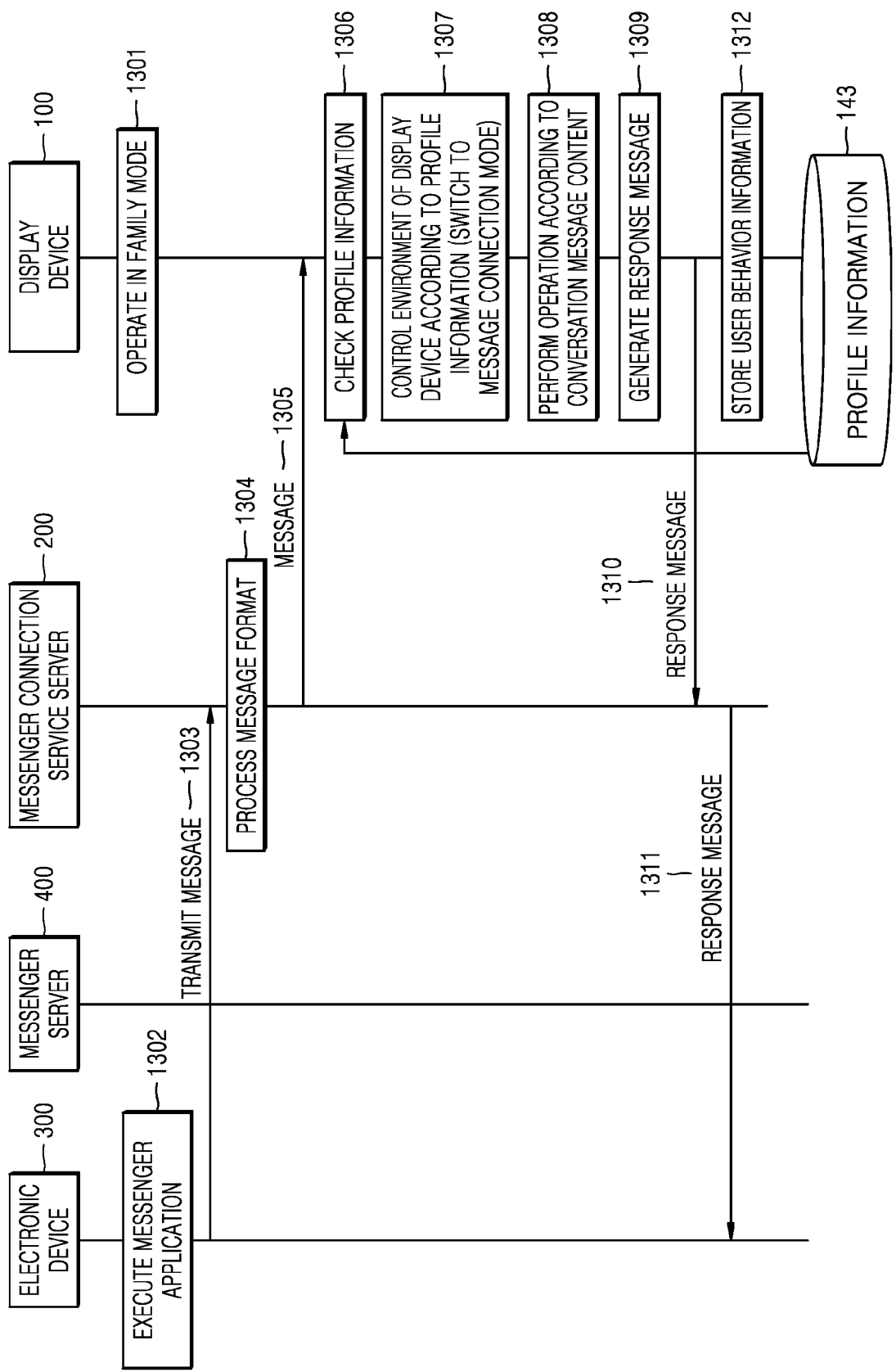
FIG. 13 illustrates an example method of switching to a messenger connection mode during operation in a family mode, according to various embodiments.

FIG. 13 is an example method of switching to a messenger connection mode during operation in a family mode, according to various embodiments.

Referring to FIG. 13, in operation 1301, the display device 100 may operate in a family mode. In the family mode, one or more users may view the display device 100 in common.

While the display device 100 is operating in the family mode, the electronic device 300 may execute a messenger application in operation 1302, and transmit a message using the executed messenger application in operation 1303.

The messenger connection service server 200 may process a format of the received message in operation 1304, and transmit the processed message to the display device 100 in operation 1305.

In operation 1306, when receiving the message, the display device 100 may check profile information corresponding to messenger connection information regarding the user who transmitted the message.

In operation 1307, the display device 100 may switch its mode to a messenger connection mode according to the obtained profile information. Specifically, the display device may control a display device environment based on content included in the obtained profile information. Controlling the environment of the display device according to the profile information may, for example, refer to changing or controlling any of the items that can control the environment of the display device according to details of the profile information. For example, the display device 100 may control a volume of the display device or a brightness or color of a display screen, based on volume information, brightness information, or color information included in the profile information. For example, the display device 100 may configure a home screen according to home screen configuration information included in profile information. For example, the display device 100 may obtain its own Internet connection account information from the profile information. For example, the display device 100 may configure a voice command interpreter according to the profile information. For example, the display device 100 may obtain profile information for a Netflix® account or login information for a YouTube® account based on the profile information.

In operation 1308, the display device 100 may perform an operation according to the content of the message. For example, when the content of the message is related to control of the environment of the display device, the display device 100 may control its environment accordingly. For example, when the content of the message is to change a TV channel on the display device or increase the volume, the display device 100 may perform an operation according to such a control command.

In operation 1309, the display device 100 may generate a response message. The response message is optional, and it may not be necessary to generate a response message depending on the status of the message transmitted from the user. For example, when the message from the user requires a response or additional explanation, the display device 100 may generate the response message.

In operation 1310, the display device 100 may transmit the response message to the messenger connection service server 200, and in operation 1311, the messenger connection service server 200 may convert the received response message into a message format used by a messenger system corresponding to the messenger connection information, and transmit the resulting response message to the electronic device 300 via the messenger server 400.

In operation 1312, the display device 100 may store, as profile information about the user, user behavior information including the content of the message received from the user or information about content related to the operation according to the content of the message. For example, while in a messenger connected state, the user may log in to YouTube, which is an application installed on the display device, with his or her account and view content on the YouTube. As a login method, when the user uses a messenger application on the electronic device to enter login information in a messenger's menu window, the display device may store the entered YouTube login information as profile information about the corresponding user. Also, for example, even when the user logs in to YouTube using a remote control that controls the display device in a messenger connected state, the display device may store the login information as profile information about the user corresponding to a current messenger connection mode. Also, a connection state may be maintained until the connection state is terminated or the messenger connection mode is changed to another user.

Figure 14:
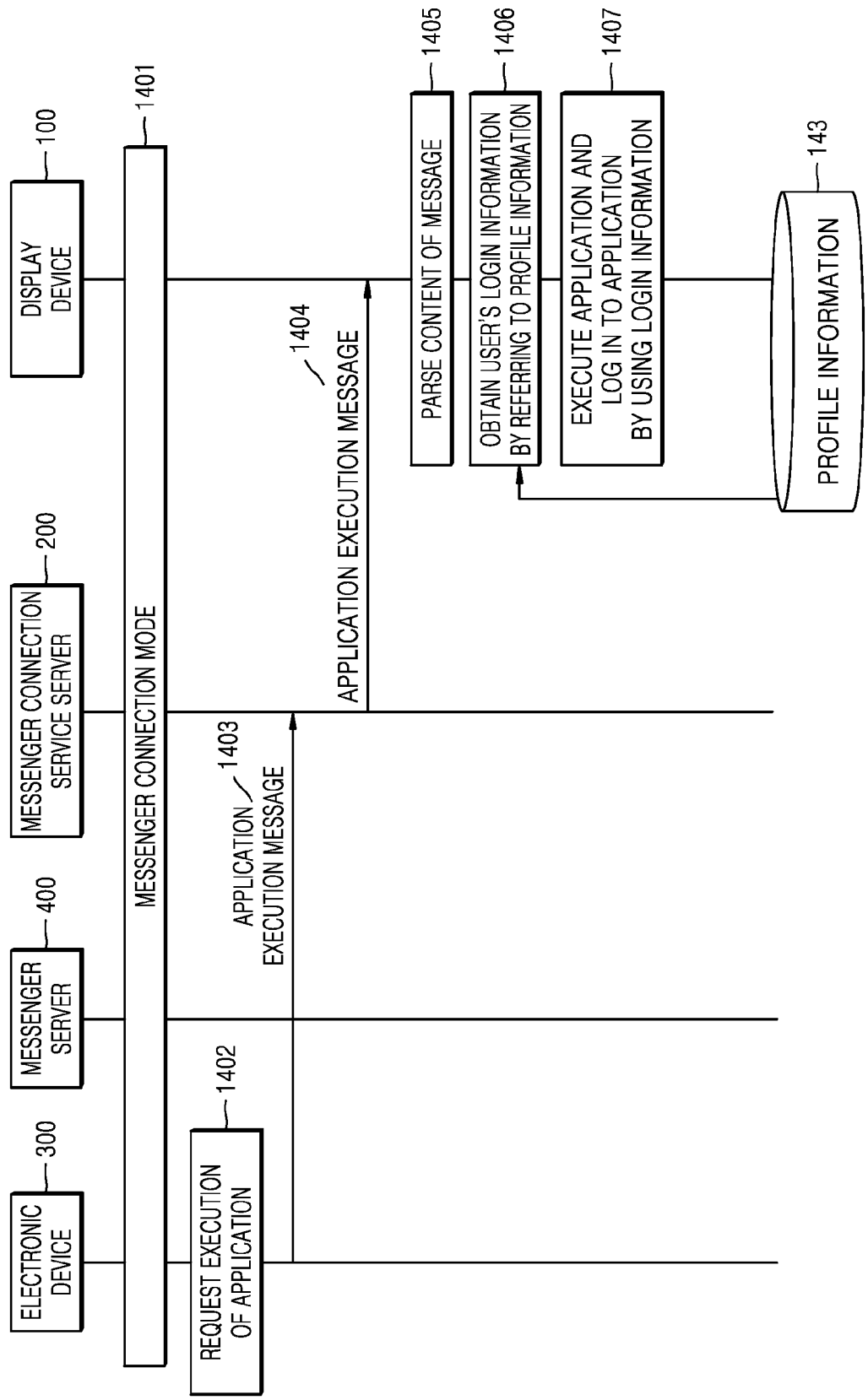
FIG. 14 illustrates an example process of logging in to an application by referring to profile information about a user in a messenger connection mode, according to various embodiments.

FIG. 14 is a diagram illustrating an example of logging in to an application by referring to profile information about a user in a messenger connection mode, according to various embodiments.

Referring to FIG. 14, in operation 1401, the display device 100 may operate in a messenger connection mode with the electronic device 300. Operating in the messenger connection mode with the electronic device 300 may, for example, refer to a state in which the electronic device 300 and the display device 100 are connected using a messenger system used by a user of the electronic device 300, and a state in which the display device 100 controls the environment of the display device 100 and performs operations according to profile information corresponding to registered messenger connection information.

In operation 1402, the electronic device 300 may request execution of an application on the display device while in the messenger connection mode. For example, the user of the electronic device 300 may input a message requesting execution of a specific application using a messenger system. For example, the user may input a message such as <Launch YouTube>.

In operation 1403, the electronic device 300 may transmit the input application execution message to the messenger connection service server 200 via the messenger server 400.

In operation 1404, the messenger connection service server 200 may transmit the received application execution message to the display device 100.

In operation 1405, the display device 100 may receive the application execution message and parse the content of the received application execution message to determine that login information is required to execute the corresponding application.

In operation 1406, the display device 100 may obtain login information for the user to execute the corresponding application by referring to the profile information 143 about the corresponding user.

In operation 1407, the display device 100 may execute the application and perform a login operation using the obtained login information.

Figure 15:
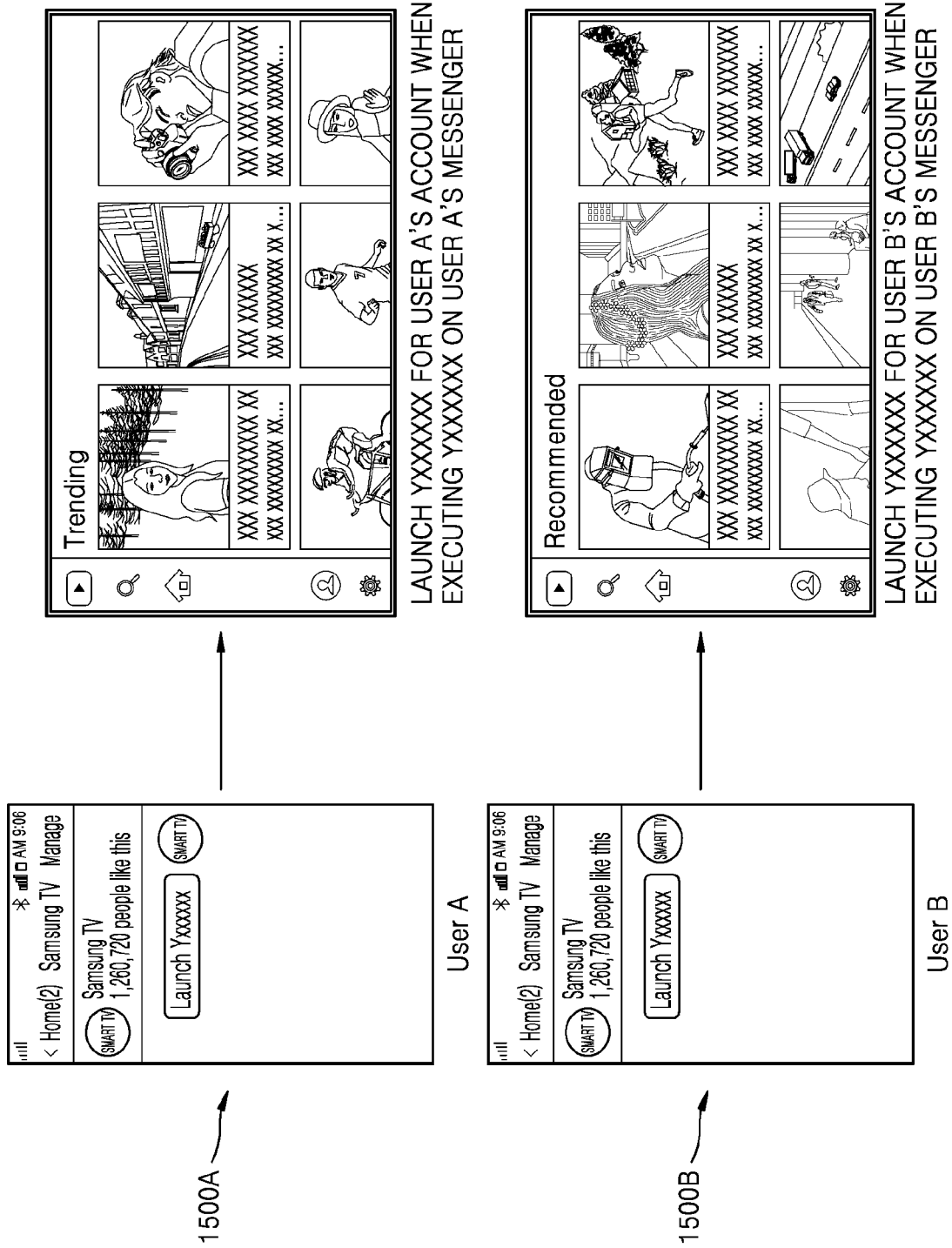
FIG. 15 is a diagram for describing an example of executing an application by using login information for each user, according to various embodiments.

FIG. 15 is a diagram for describing example executing of an application by using login information for each user, according to various embodiments.

Referring to 1500A of FIG. 15, when the display device 100 receives a Yxxxxxx application execution message from user A while operating in a messenger connection mode corresponding to the user A, the display device 100 may obtain Yxxxxxx application account information from stored profile information corresponding to the user A and execute a YouTube application using the Yxxxxxx application account information corresponding to the user A.

Referring to 1500B of FIG. 15, when the display device 100 receives a Yxxxxxx application execution message from user B while operating in a messenger connection mode corresponding to the user B, the display device 100 may obtain Yxxxxxx application account information from stored profile information corresponding to the user B and execute the YouTube application using the Yxxxxxx application account information corresponding to the user B.

By connecting the display device to a user's messenger in advance, the user may easily execute an application using his or her account information by simply transmitting an application execution message via the messenger registered in messenger connection information without having to enter separate login or account information.

According to an embodiment, the display device may change a user who is messenger-connected thereto while operating in a messenger connection mode. For example, the display device may operate in the messenger connection mode corresponding to the user A and then change to the messenger connection mode corresponding to the user B using an explicit or implicit method.

Figure 16:
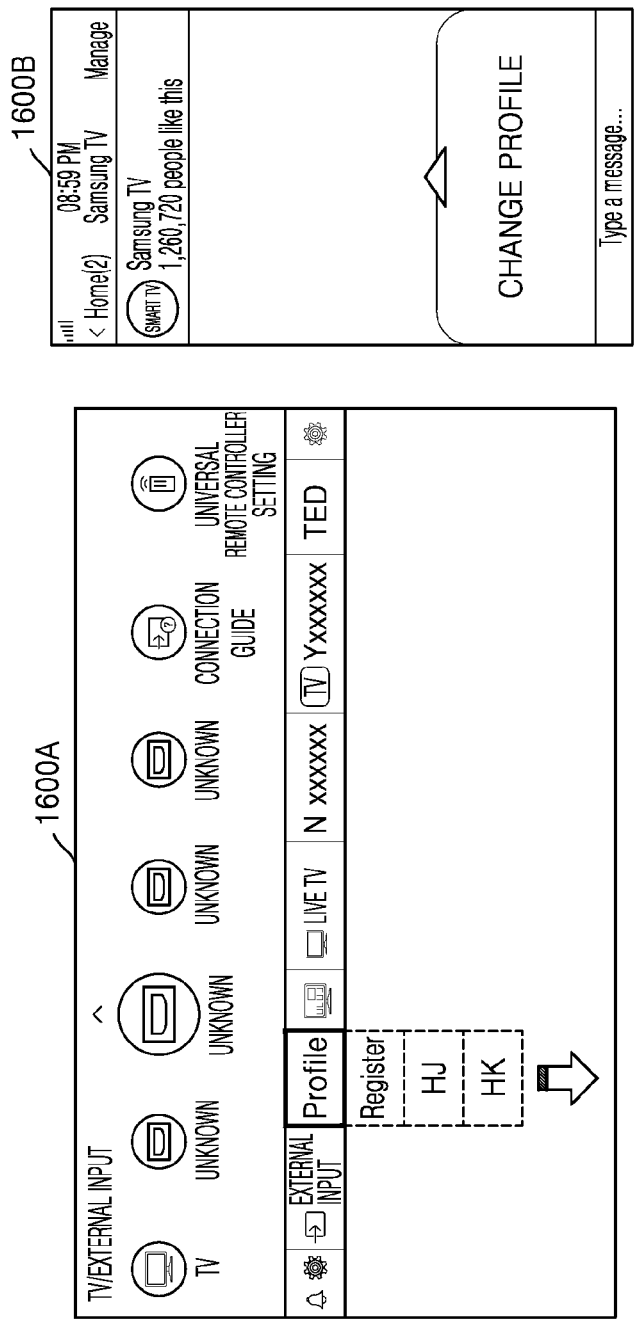
FIG. 16 is a diagram for describing an example in which a display device explicitly changes a messenger connected user during operation in a messenger connection mode corresponding to the messenger connected user, according to various embodiments.

FIG. 16 is a diagram for describing an example in which a display device explicitly changes a messenger connected user during operation in a messenger connection mode corresponding to the messenger-connected user, according to various embodiments.

Referring to 1600A of FIG. 16, the display device 100 may provide a user interface for changing a messenger-connected user. In a Profile menu, a <Register> tab for newly registering a user and names of messenger-connected users registered on the display device 100 may be displayed. The user may change a messenger-connected user by selecting a name of a messenger-connected user included in the Profile menu. For example, when the display device 100 selects a messenger-connected user <HK> during operation in a messenger connection mode currently corresponding to a messenger-connected user <HJ>, then the display device 100 may change the messenger connection mode of the display device 100 from user <HJ> to user <HK>.

Referring to 1600B of FIG. 16, when the user requests a profile change via an electronic device using a profile change menu additionally provided by a messenger system, the display device 100 may change the messenger connection mode of the display device to a user corresponding to the profile change request.

Implicitly changing a messenger connected user in a messenger connection mode of the display device refers, for example, to an operation in which the display device is operating in a messenger connection mode corresponding to an existing user and, upon reception of a connection request from another user, changes to a messenger connection mode corresponding to the other user. For example, when the display device 100 receives a message from user B via a messenger system while operating in a messenger connection mode corresponding to user A, the display device 100 may change the messenger connection mode from the user A to the user B. That is, the display device 100 may change profile information referred to by the display device 100 from user A's profile information to user B's profile information. Accordingly, the display device 100 may change and control a display device environment, which has been controlled according to the user A's profile information, according to the user B's profile information.

According to example embodiments, the display device 100 may release the messenger connection mode of the display device 100 and switch to the family mode according to a user's logout request. The user's logout request may be received by receiving a logout request message through a messenger window on the electronic device, by using a specific key on a remote control for the display device, or through a logout function provided via a user interface provided by the display device. Alternatively, when the display device is powered off, the display device may immediately switch to the family mode, which is a default state, or switch to the family mode after a lapse of a time set for the display device. The family mode refers, for example, to a default setting state of a display device to which a messenger is not connected. For example, when the display device is used as a shared device in a home and there are children, user settings such as a parental lock (an adult content protection function) may be usually set up on the display device. When a state in which the parental lock is set up on the display device in this way is set to a default family mode, in a message connection mode corresponding to a specific user, the parental lock is released and the display device operates according to an environment set by the specific user, but when the messenger connection mode corresponding to the specific user is released and the family mode is applied again, the parental lock settings may be restored.

Figure 17:
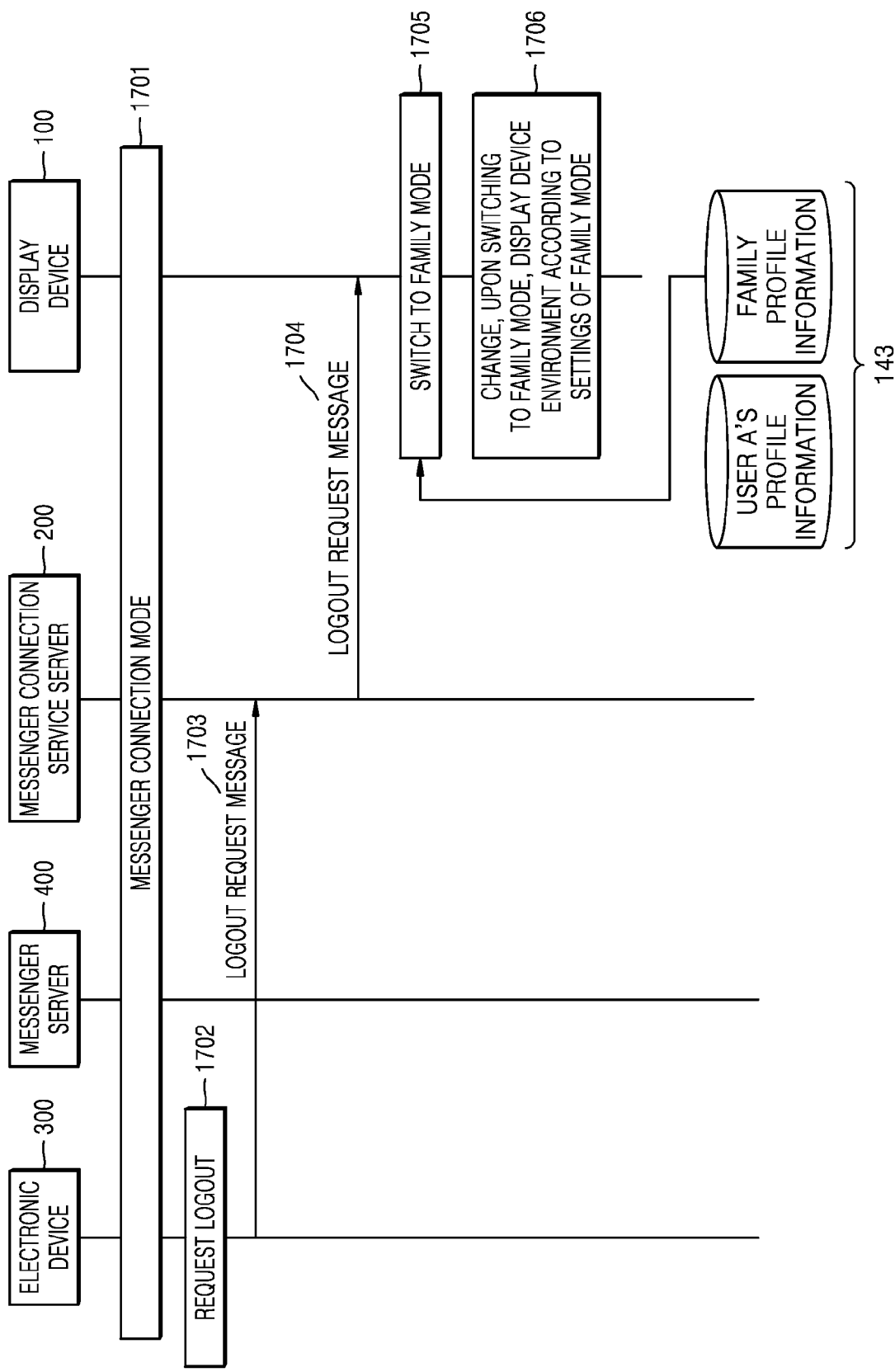
FIG. 17 is a flowchart illustrating an example process of switching from a messenger connection mode to a family mode, according to various embodiments.

FIG. 17 is a flowchart illustrating an example process of switching from a messenger connection mode to a family mode, according to various embodiments.

Referring to FIG. 17, in operation 1701, the display device 100 may operate in a messenger connection mode corresponding to user A using the electronic device 300. According to user A's profile information, a parental lock on the display device 100 may be released in the messenger connection mode corresponding to the user A.

While the display device 100 is operating in the messenger connection mode corresponding to the user A in this way, in operation 1702, the user A of the electronic device 300 may request logout by using a messenger system.

In operation 1703, the electronic device 300 may transmit a logout request message to the messenger connection service server 200 via the messenger server.

In operation 1704, the messenger connection service server 200 may transmit the received logout request message to the display device 100.

In operation 1705, the display device 100 may interpret the received logout request message to release the messenger connection mode corresponding to the user A from its current state and switch to a family mode.

In operation 1706, the display device 100 may change, upon the switching to the family mode, a display device environment according to family mode settings. In the messenger connection mode corresponding to the user A, the display device 100 controls an environment of the display device 100 and recommends content by referring to the user A's profile information, whereas in the family mode, the display device 100 may control the environment of the display device 100 or recommend content according to family profile information instead of referring to the user A's profile information. For example, the parental lock is released in the messenger connection mode corresponding to the user A, but the parental lock may be restored to the default state in the family mode. For example, because YouTube login information is stored in the user A's profile information, in the messenger connection mode corresponding to the user A, the user may launch YouTube by simply transmitting a message requesting launch of YouTube without the need for separate YouTube login information. However, when separate registered YouTube login information is not stored in the family mode, users may need to enter login information to launch YouTube in the family mode.

Figure 18:
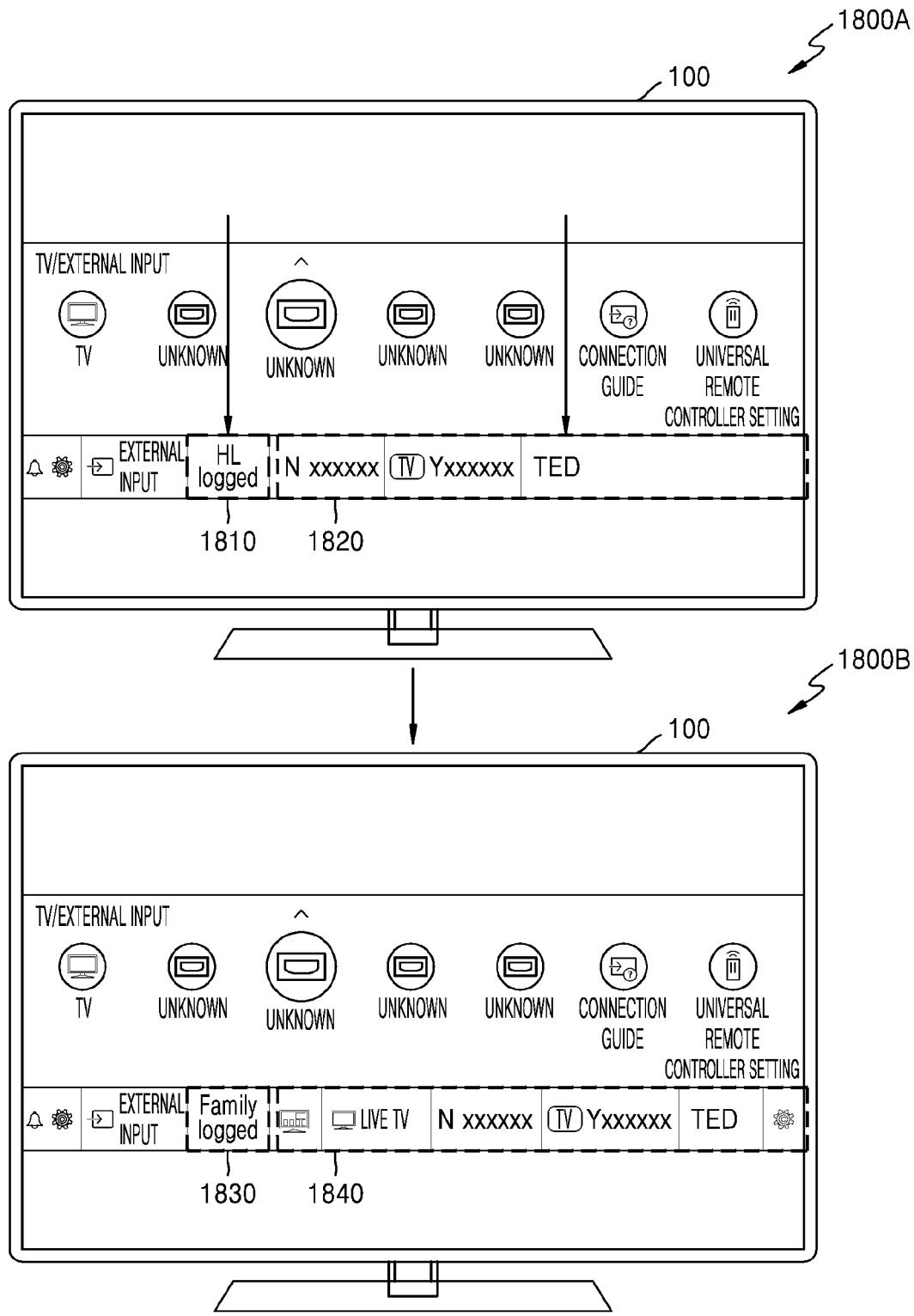
FIG. 18 is a diagram for describing an example in which a configuration of a home screen of a display device changes when the display device switches from a messenger connection mode to a family mode, according to various embodiments.

FIG. 18 is a diagram for describing an example in which a configuration of a home screen of a display device changes when the display device switches from a messenger connection mode to a family mode, according to various embodiments.

1800A of FIG. 18 shows a state in which a user has changed the order or configuration of applications displayed on a home screen of the display device to suit the user in a messenger connection mode of the display device. On the home screen, the display device 100 displays an item 1810<HL Logged> to indicate that the display device 100 is currently in the messenger connection mode, and also shows menus 1820 including Nxxxxxx, Yxxxxxx, and TED arranged in the order of applications preferred by the user.

When switching from the messenger connection mode as shown in 1800A to the family mode, the display device 100 may restore and display the configuration of the home screen to its default state without referring to user's profile information any longer, as shown in 1800B. Referring to 1800B, the display device 100 displays an item 1830 <Family Logged> on the home screen to indicate the family mode, and also displays application items 1840 in the order of application items that are set by default on the display device 100, e.g., live TV, Nxxxxxx, Yxxxxxx, and TED.

Figure 19:
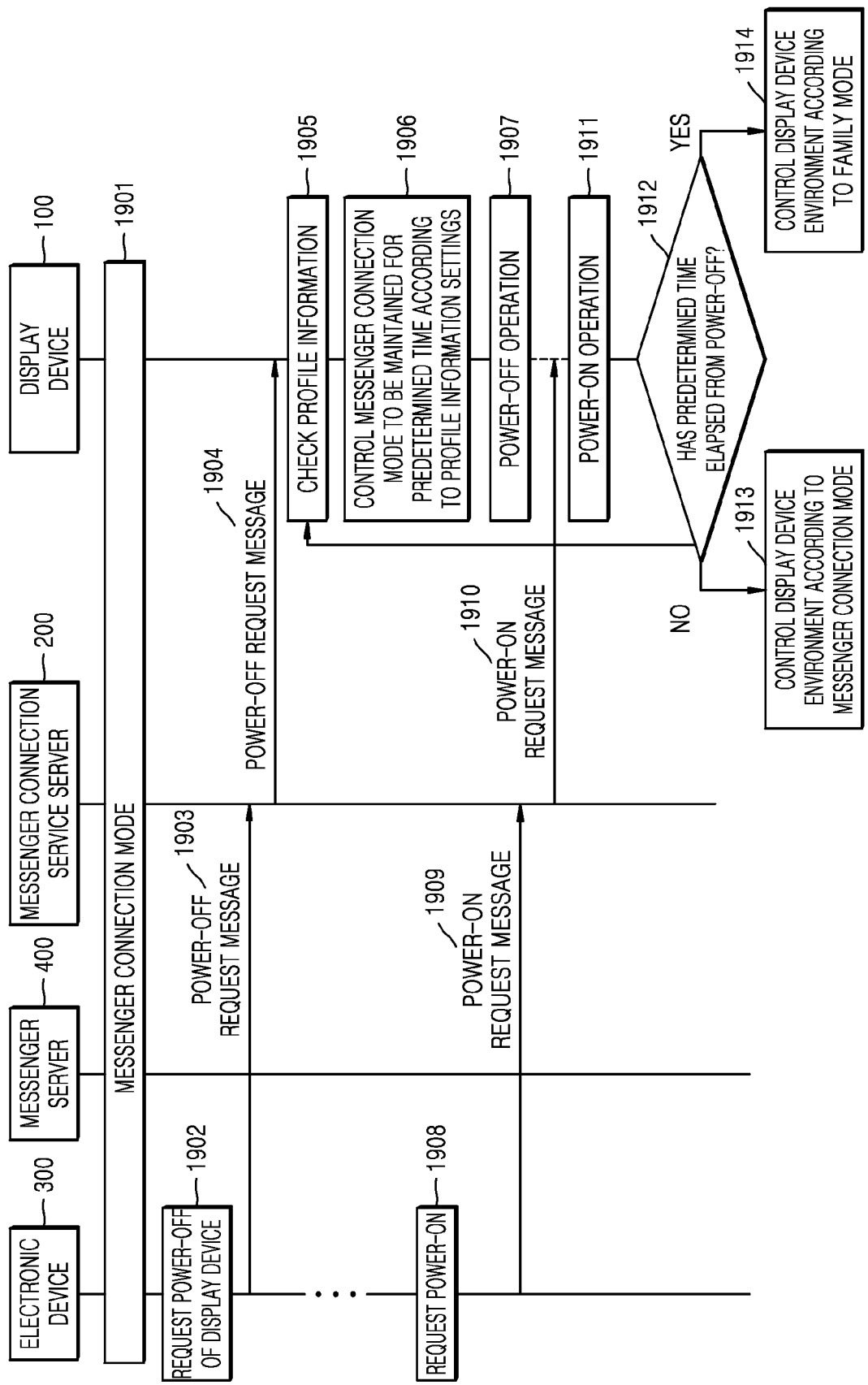
FIG. 19 is a flowchart illustrating an example process of switching to a family mode when a display device is powered off, according to various embodiments.

FIG. 19 is a flowchart illustrating an example of switching to a family mode when a display device is powered off, according to various embodiments.

Referring to FIG. 19, in operation 1901, the display device 100 may operate in a messenger connection mode corresponding to user A using the electronic device 300. In the messenger connection mode corresponding to the user A, according to user A's profile information, the display device 100 may be in a state of controlling a display device environment, configuring its home screen, and recommending content.

In operation 1902, the user of the electronic device 300 may request power-off of the display device using a corresponding messenger system.

In operation 1903, the electronic device 300 may transmit a power-off request message to the messenger connection service server 200 via the messenger system.

In operation 1904, the messenger connection service server 200 may transmit the received power-off request message to the display device 100.

In operation 1905, the display device 100 may receive the power-off request message and check user A's profile information. This is to check whether setting information for maintaining the messenger connection mode for a specified time when the display device is powered off is stored in the user A's profile information.

In operation 1906, the display device 100 may control the display device to maintain the messenger connection mode for a predetermined time from power-off according to profile information settings. For example, when the profile information includes settings for immediately switching to the family mode when the display device is powered off, the display device 100 may immediately perform a power-off operation without a separate control operation. However, the profile information may include settings for, instead of switching to the family mode immediately when the display device is powered off, maintaining the messenger connection mode for a predetermined time and switching to the family mode after the predetermined time has elapsed. For example, the setting information may indicate that the display device 100 is logged out of the messenger connection mode when 1 hour has elapsed from power-off. This is because switching to the family mode after a specified time may be convenient for the user, considering a case in which the user wants to use the display device in the messenger connection mode, power it off, and then use the display device in the messenger connection mode again immediately after the power-off.

In this way, the display device 100 may control an operation of a counter for counting the time elapsed since power-off of the display device with regard to the profile information. By controlling the operation of the counter and checking information about the time counted by the counter, the display device may determine how much time has elapsed since the power-off when there is a command to power on the display device again after the power-off of the display device.

In operation 1907, the display device 100 may perform a power-off operation. For example, by performing the power-off operation, the display device 100 may maintain a suspend to RAM state in which settings information may be retained while the screen of the display device is turned off but the power is not completely cut off, and, when powered back on, the display device 100 may retain message connection information regarding a last user before the power-off.

In operation 1908, the user of the electronic device 300 may request power-on of the display device.

In operation 1909, the electronic device 300 may transmit a power-on request message to the messenger connection service server 200, and in operation 1910, the messenger connection service server 200 may transmit the power-on request message to the display device 100.

In operation 1911, when receiving a power-on request message, the display device 100 may perform a power-on operation.

In operation 1912, the display device 100 may check the counter set in operation 1906 to determine whether the predetermined time has elapsed from the power-off.

In operation 1913, when the predetermined time has not elapsed from the power-off, the display device 100 may control a display device environment according to the messenger connection mode.

In operation 1914, when the predetermined time has elapsed from the power-off, the display device 100 may control the display device environment according to the family mode.

While the example of FIG. 19 illustrates a case in which a display device power-off request or a display device power-on request is received using the messenger system for the electronic device 300, embodiments are not necessarily limited thereto. It should be understood that the same process may also be applied even when the display device power-off request or display device power-on request is received via a remote controller controlling the display device 100.

According to an example embodiment, the display device 100 may also receive and process a voice message transmitted via a messenger system. When a voice command is transmitted via the messenger system, the display device may receive the voice command via the service server, and the display device 100 may store, in messenger connection information or profile information about the user, information about a voice interpreter used to interpret a voice in the received voice message.

Figure 20:
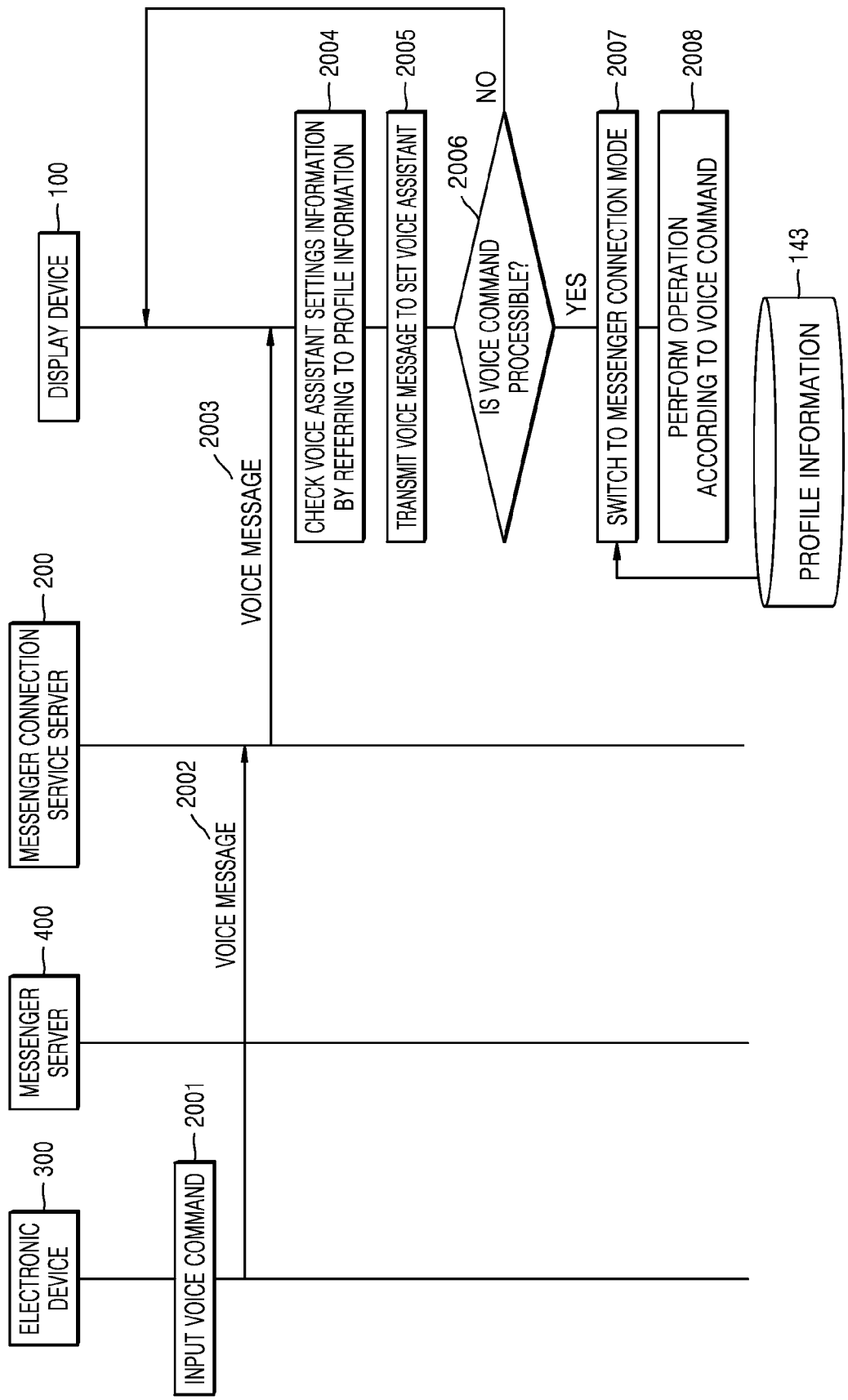
FIG. 20 is a flowchart illustrating an example processing method when a display device receives a voice message via a messenger system, according to various embodiments.

FIG. 20 is a flowchart illustrating an example processing method when a display device receives a voice message via a messenger system, according to various embodiments.

Referring to FIG. 20, in operation 2001, the user of the electronic device 300 may input a voice command using a messenger system for the electronic device 300.

In operation 2002, the electronic device 300 may transmit a voice message including the voice command input by the user to the messenger connection service server 200 via the messenger server 400.

In operation 2003, the messenger connection service server 200 may transmit the received voice message to the display device 100.

In operation 2004, the display device 100 may identify a user who has transmitted the voice message and check whether voice recognizer settings information is registered by referring to profile information corresponding to the identified user. When one or more voice recognizers may be available in the display device 100, the profile information about the user may include settings information about a voice recognizer to be used. For example, there are various voice recognizers such as Bixby, Alexa, and Google Assistant, and the voice recognizers may be built into the display device or connected to the display device 100 in an external form, and recognize a voice command from the user to perform an operation corresponding to the recognized voice command.

In operation 2005, when the voice recognizer settings information is registered, the display device 100 may transmit a voice message to the set voice recognizer. For example, when <Bixby> is set as a voice recognizer in profile information corresponding to user A, the display device 100 may transmit a voice message to Bixby to cause Bixby to interpret the voice message.

In operation 2006, the display device 100 may determine whether the voice command included in the received voice message is processible, and end the operation when it is not processible.

In operation 2007, when the voice command included in the received voice message is processible, the display device 100 may switch to the messenger connection mode by referring to the profile information corresponding to the user. That is, the display device 100 may control the display device environment by referring to the profile information corresponding to the user.

In operation 2008, the display device 100 may perform an operation corresponding to the voice command included in the voice message. For example, when the voice command included in the voice message is <MTV channel>, the display device 100 may perform an operation of changing to the MTV channel.

While the example of FIG. 20 includes operation 2007 of switching to the messenger connection mode corresponding to the user who transmitted the voice message, operation 2007 may be omitted when the display device was already operating in the messenger connection mode corresponding to the user before the user inputs the voice command.

According to an example embodiment, users in different spaces may watch a broadcast together using a messenger connection mode, and also a multi-view that simultaneously displays content and a message conversation window on the screen of the display device may be implemented through message transmission. For example, when a user is watching TV and desires to share information about a program he or she is currently watching with a friend, the user may transmit a message <Watch Together> in a messenger window, and, in this case, the TV may obtain information about the program currently being watched, and user A may share the program information with a messenger friend user B using a message sharing function of the messenger. When the user B performs a Watch Together via the received message, a screen of the display device of the two users may be split, and a chat window may be displayed on the split screen. Thereafter, users can have a one-on-one (1:1) conversation about the program being watched together via the messenger window on the TV screen.

Figure 21:
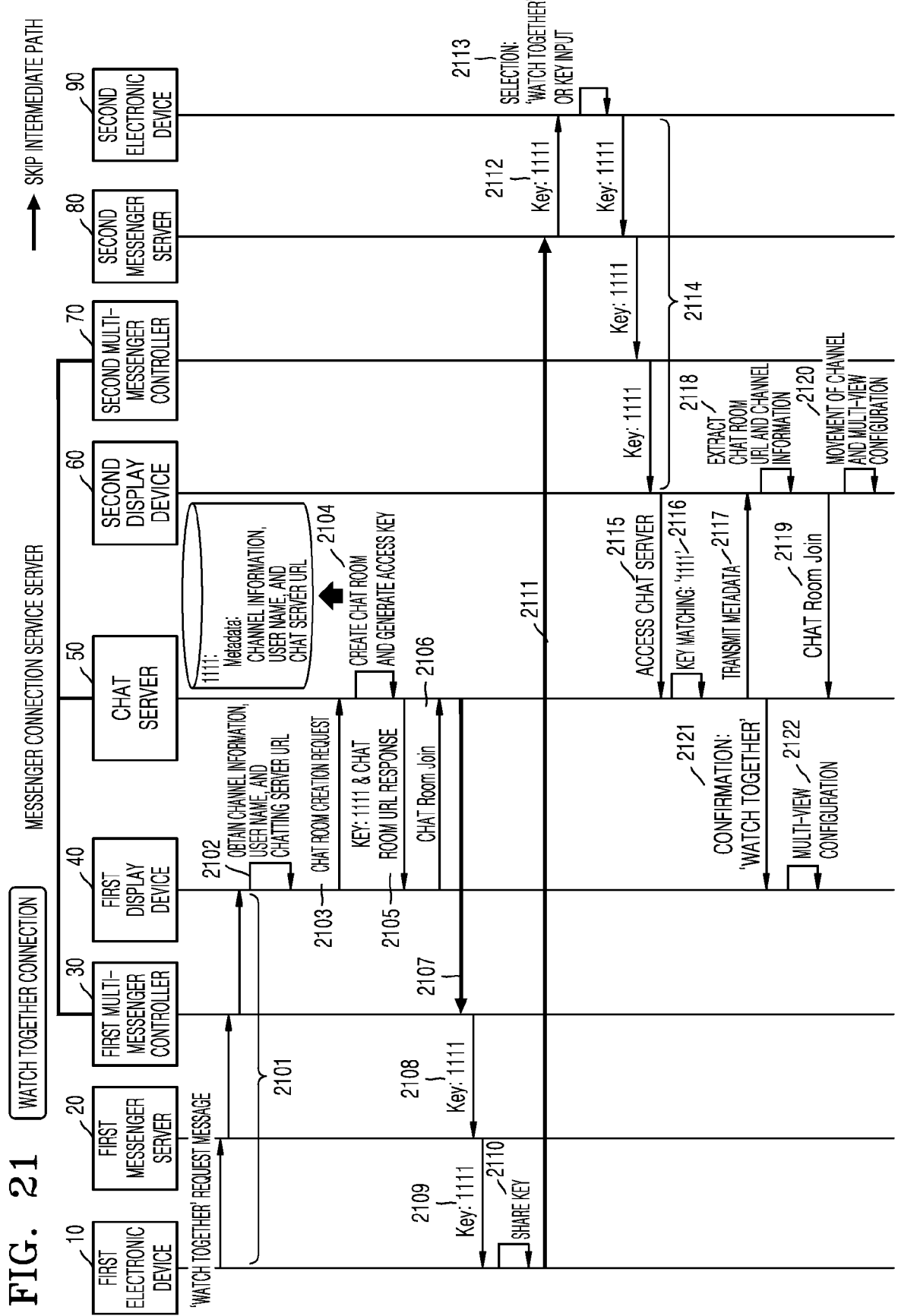
FIG. 21 is a flowchart illustrating an example method for allowing one user to watch content together with another user by using a messenger connection system, according to various embodiments.

FIG. 21 is a flowchart illustrating an example method for allowing one user to watch content together with another user using a messenger connection system, according to various embodiments.

Referring to FIG. 21, a first electronic device 10 and a first display device 40 may be devices used by a first user, and a first messenger server 20 may be a server for operating a first messenger system used by the first user via the first electronic device 10. A second electronic device 90 and a second display device 60 may be devices used by a second user, and a second messenger server 80 may be a server for operating a second messenger system used by the second user via the second electronic device 90. The first messenger server 20 and the second messenger server 80 may be the same messenger server or different messenger servers. The messenger connection service server may include a first multi-messenger controller 30, a chat server 50, and a second multi-messenger controller 70. As the first multi-messenger controller 30 is for processing a message format used by the first messenger system and the second multi-messenger controller 70 is for processing a message format used by the second messenger system, the first multi-messenger controller 30 may be the same as the second multi-messenger controller 70 when the first messenger system is the same as the second messenger system.

In operation 2101, while the first display device 40 is playing content in a messenger connection mode with the first electronic device 10, the first electronic device 10 may transmit a sharing request message to the first display device 40 via the first messenger server 20 and the first multi-messenger controller 30 according to a <watch together> request from the first user. The sharing request message may be a text message including text <Watch together> input by the first user, or a voice message including <Watch together> uttered by the first user.

Figure 22:
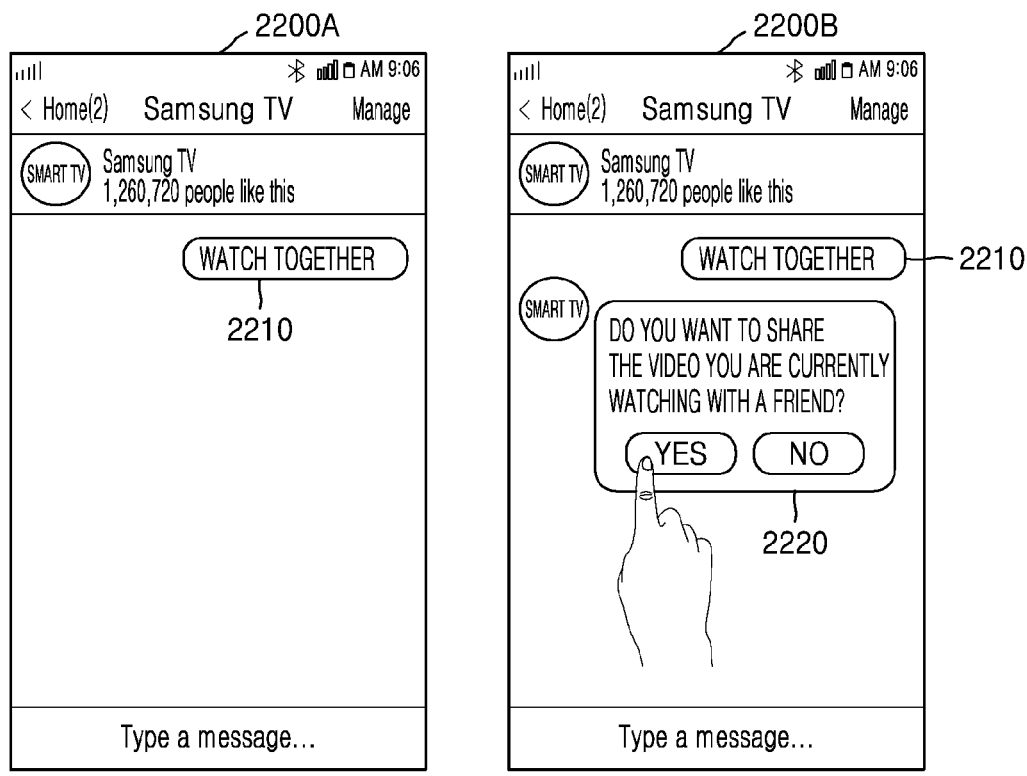
FIG. 22 illustrates example user interfaces on a first electronic device during a process in which a first user makes a sharing request for sharing content being played on a first display device with a second user, according to various embodiments.

FIG. 22 illustrates example user interfaces on a first electronic device during a process in which a first user makes a sharing request for sharing content played on a first display device with a second user, according to various embodiments.

Referring to 2200A of FIG. 22, while connected to the first display device 40 using the first messenger system, the first user may transmit a sharing request message to the first display device 40 by entering text 2210 <Watch together> via the first electronic device 10 of the first user. In response to the sharing request message, the first electronic device 10 may display a message 2220 received from the first display device 40, as shown in 2200B of FIG. 22. The message received from the first display device 40 and displayed on the first electronic device 10 may include a confirmation of the content to be shared, such as <Do you want to share the video you are currently watching with a friend?>. Then, in response to the message 2220, the first user may select <YES>.

In operation 2102, when receiving the watch together request message, the first display device 40 may obtain, according to the watch together request from the first user, information about content currently being played by the first display device 40, the name of the first user, and a chat server URL for accessing the chat server.

In operation 2103, the first display device 40 may access the chat server 50 using the chat server URL and transmit a chat room generation request message to the chat server 50.

A message for requesting access to a chat room may include the information about the content and the first user name.

In operation 2104, when receiving the chat room generation request message, the chat server 50 may generate a chat room according to a chat room generation request, and generate an access key for accessing the generated chat room, for example, "1111". The chat server 50 may also generate metadata about the generated chat room, including the information about the content being played on the first display device 40, the first user name, and a chat room URL that is an address for accessing the generated chat room.

According to an embodiment, the metadata about the generated chat room may further include time information about the playback progress of the content being played on the first display device 40 and a key expiration time based on the time information about the playback progress. When the second display device 60 receives the metadata and then plays the content to be watched together with the first display device 40, the time information about the playback progress of the content being played may be used to determine a playback timing of the content to be watched together. The playback timing may not be necessary when the content to be watched together is live broadcast content, but when the content to be watched together is content received from a content providing service server, information about the playback time of the content may be used to time the playback of the content watched by the first user with the playback of the content watched by the second user. In addition, the key expiration time included in the metadata may represent a validity period of the watch together request message. For example, when the second user who has received the watch together request message approves the watch together request after the first user has already finished watching the content or after the live broadcast content has ended, playback of the entire content will have ended, making such approval from the second user meaningless. Therefore, such key expiration time information may be used to prevent multi-view conversion when the second user selects to watch together after the key expiration time.

In operation 2105, the chat server 50 may transmit, to the first display device 40, a response message including the generated chat room URL and access key.

In operation 2106, the first display device 40 may join a chat room generated by the chat server 50 using the received chat room URL and access key.

In operation 2107, the chat server 50 may transmit the access key for accessing the generated chat room to the first multi-messenger controller 30, in operation 2108, the first multi-messenger controller 30 may transmit the received access key to the first messenger server 20, and in operation 2109, the first messenger server 20 may transmit the received access key to the first electronic device 10.

In operation 2110, the first electronic device 10 may perform an operation of sharing the chat room access key with another user, e.g., the second user. The operation of sharing the access key may include, for example, identifying the second user with whom to share the access key, and receiving a user input for confirming the sharing of the access key with the identified second user.

Figure 23:
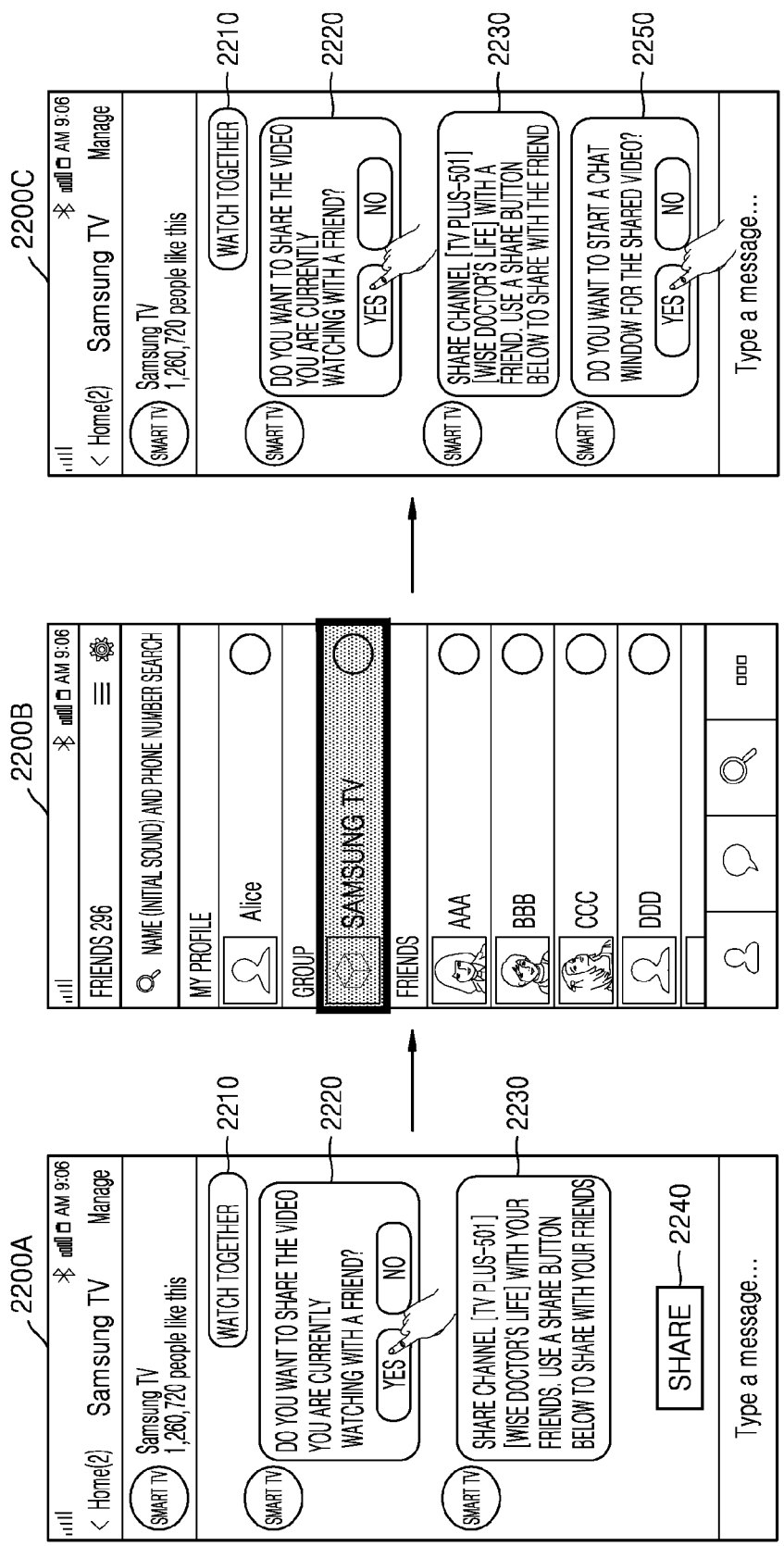
FIG. 23 illustrates example user interfaces on a first electronic device during a process in which a first user makes a sharing request for sharing content being played on a first display device with a second user, according to various embodiments.

FIG. 23 illustrates examples user interfaces on a first electronic device during a process in which a first user makes a sharing request for sharing content being played on a first display device with a second user, according to various embodiments.

For example, referring to FIG. 23, the first electronic device 10 may output a message 2230 <Share Channel [TV Plus-501][Wise Doctor's Life] with your friends. Use a share button below to share with your friends>. When the first user selects the <Share> button 2240 in response to the message 2230, the first electronic device 10 may output a user interface as shown in 2300B, so that the first user may select a counterpart friend with whom to share content. The first user may select, via the user interface shown in 2300B, a friend with whom to share content played on the first display device, and according to a selection of the friend, the first electronic device 10 may identify a second user as a friend to share the content with.

In operation 2111, the first electronic device 10 may transmit the access key to the second messenger server 80 to which the second user to share the content with is connected.

In operation 2112, the second messenger server 80 may transmit the access key to the second electronic device 90.

In operation 2113, the second device 90 may perform an operation of confirming the watch together request. For example, the second device 90 may display a message informing that the watch together request has arrived from the first user and receive, from the second user, an input for approving the watch together request. Alternatively, the second device 90 may display the access key from the first user and also provide a user interface requiring input of the access key as an approval of the watch together request, and receive an access key input from the second user.

Figure 24:
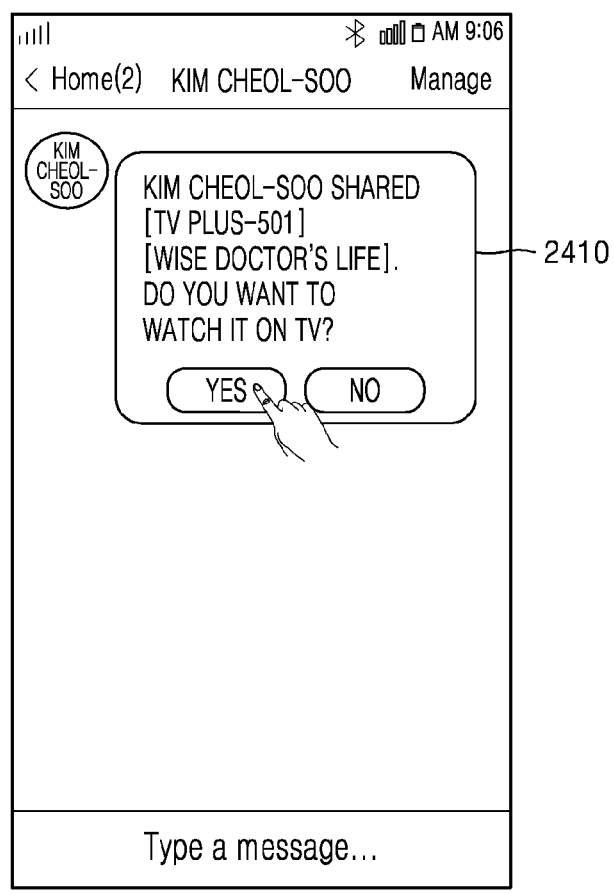
FIG. 24 illustrates an example user interface displayed on a second user's electronic device in response to a sharing request made by a first user to share content played on a first display device with a second user, according to various embodiments.

FIG. 24 illustrates an example user interface displayed on a second user's electronic device in response to a sharing request made by a first user to share content played on a first display device with a second user, according to various embodiments.

For example, referring to FIG. 24, the second electronic device 90 may output a message 2410 <Kim Cheol-soo shared [TV Plus-501][Wise Doctor's Life]. Do you want to watch it on TV?>, and when the second user selects <YES> in response to the message 2410, the second electronic device 90 may determine that the second user has approved the content watch together request from the first user.

In operation 2114, the second device 90 may transmit the access key to the second display device 60 via the second messenger server 80 and the second multi-messenger controller 70, according to the second user's approval for the watch together request.

In operation 2115, the second display device 60 that has received the chat room access key may access the chat server 50 using the access key.

In operation 2116, the chat server 50 may search for a chat room that matches the access key received from the second display device 60.

In operation 2117, the chat server 50 may transmit, to the second display device 60, metadata about the chat room matching the access key as a search result.

In operation 2118, the second display device 60 may extract a chat room URL and content information from the metadata received from the chat server 50.

In operation 2119, the second display device 60 may join the chat room by using the extracted chat room URL.

In operation 2120, the second display device 60 may control the corresponding content to be played based on the content information extracted from the metadata. For example, when the content currently being played on the second display device 60 is first broadcast content and the content information extracted from the metadata indicates the second broadcast content, the second display device 60 may change the channel from a first broadcasting content channel to a second broadcasting content channel. When the content information extracted from the metadata indicates third content provided by a third party service provider, the second display device 60 may play the third content by executing an application supported by the third party service provider and requesting and receiving the third content via the application.

Also, the second display device 60 may configure a screen of the second display device with multi-views. For example, the second display device 60 may divide the screen into two views to display content to be watched together in one view and a chat window between the first user and the second user in the other view.

Figure 25:
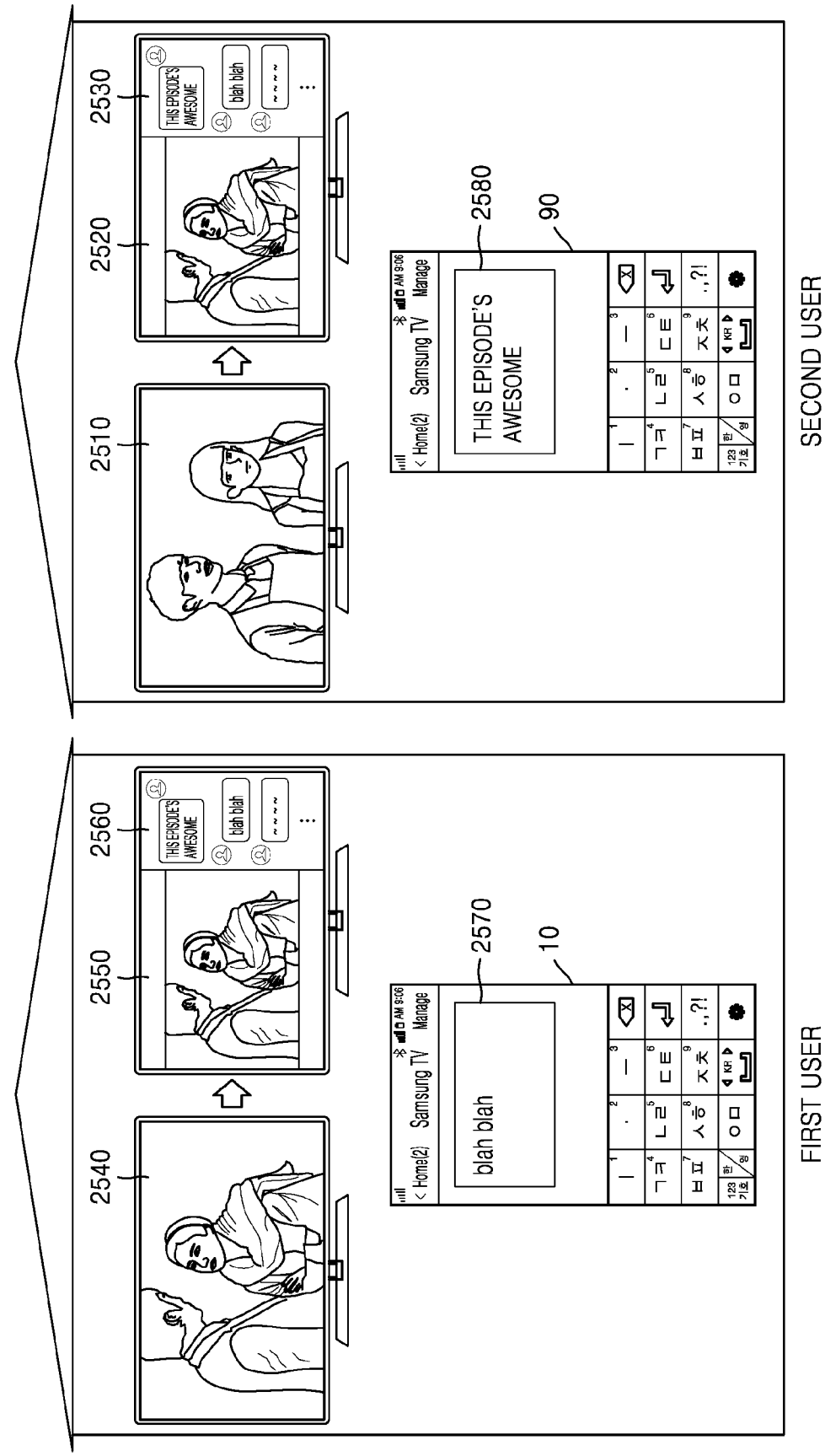
FIG. 25 illustrates example multi-view screens respectively displayed on a first display device of a first user and a second display device of a second user in response to a sharing request made by the first user to share content played on the first display device with the second user, according to various embodiments.

FIG. 25 illustrates examples of multi-view screens respectively displayed on a first display device of a first user and a second display device of a second user in response to a sharing request made by the first user to share content played on the first display device with the second user, according to various embodiments.

For example, referring to FIG. 25, while the second display device 60 is playing second content in a single view 2510 at the second user's house, the second display device 60 may configure the screen with multiple views so that two or more views may be displayed according to a multi-view configuration as in operation 2120. The second display device 60 may display first content to be watched together with the first user in at least one view 2520 among the multiple views, and display a window for chatting between the first user and the second user in at least one other view 2530.

In operation 2121, based on finding the chat room matching the access key as a result of the search in operation 2117, the chat server 50 may transmit, to the first display device 40, a confirmation signal for the request to watch together with the second user.

In operation 2122, in response to reception of the confirmation signal for the watch together request from the chat server 50, the first display device 40 may configure its screen with multiple views, and display content in at least one view and a chat window in another view. For example, referring to FIG. 25, while a first display device 40 is playing first content on a single view 2540 at the first user's house, the first display device 10 may configure the screen with multiple views so that two or more views may be displayed. Furthermore, the first display device 40 may display the first content to be watched together with the second user in at least one view 2550 among the multiple views, and display a window for chatting between the first user and the second user in at least one other view 2560. The chat content entered in region 2570 of the display of first electronic device 10 by the first user and in region 2580 of the display of second electronic device 90 by the second user may be displayed in views 2530 and 2560.

Figure 26:
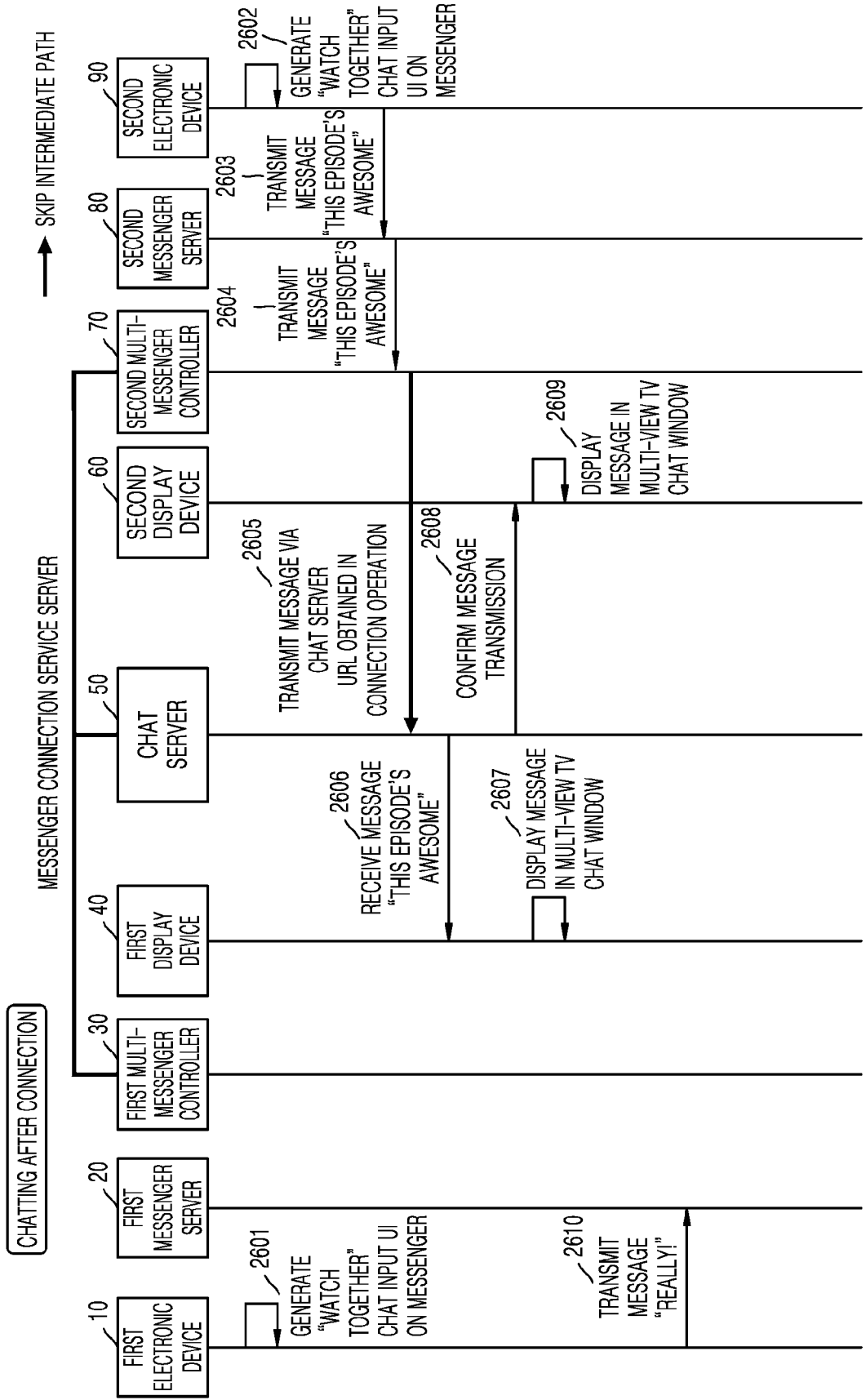
FIG. 26 is a flowchart illustrating an example method of transmitting and receiving chat messages after creating a watch together chat window, according to various embodiments.

FIG. 26 is a flowchart illustrating an example method of transmitting and receiving chat messages after creating a watch together chat window, according to various embodiments.

Referring to FIG. 26, in operation 2601, the first electronic device 10 may generate a watch together chat input user interface using a first messenger system and output it on the screen. The watch together chat input user interface represents a user interface that allows the first user to perform a chat input to chat with the second user. In one example, the first electronic device 10 may output a message 2250 <Do you want to start a chat window for the shared video?> as shown in 23000 in FIG. 23, and then output a watch together chat input user interface when receiving a selection of <YES> from the first user in response to the message 2250. For example, the chat input user interface displayed by the first electronic device 10 may have a form of output from the first electronic device 10 as shown in FIG. 25.

In operation 2602, the second electronic device 90 may generate a watch together chat input user interface using a second messenger system and output it on the screen. The watch together chat input user interface represents a user interface that allows the second user to perform a chat input to chat with the first user. The chat input user interface displayed by the second electronic device 90 may have a form of output from the second electronic device 90 as shown in FIG. 25.

In operation 2603, for example, when the second user of the second electronic device 90 inputs text <This episode's awesome> via the chat input user interface, the second electronic device 90 may transmit a message <This episode's awesome > to the second messenger server 80.

In operation 2604, the second messenger server 80 may transmit the received message to the second multi-messenger controller 70.

In operation 2605, the second multi-messenger controller 70 may transmit the received message to be provided to the generated chat room using the chat server URL and chat room URL obtained in the connection process shown in FIG. 21.

In operation 2606, the chat server 50 may transmit the received message to the first display device 40.

In operation 2607, the first display device 40 may display the received message <This episode's awesome> in a chat window view among the multiple views in the screen of the first display device 40.

In operation 2608, the chat server 50 may also transmit a confirmation message for the message received from the second display device 60.

In operation 2609, the second display device 60 that has received the confirmation message may display it in a chat window view among the multiple views in the screen of the second display device 60.

In operation 2610, when the first user of the first electronic device 10 enters text <Really!> via the chat input user interface, the corresponding message may be displayed in the chat window view through the same process as used when the second user of the second electronic device previously transmitted the message.

While it has been described in the above example that a text chat service is provided, it is also possible to provide a video chat service by configuring metadata provided when connecting to a chat service to include video information about each user.

In the example described above, the first messenger server and the second messenger server may both use the same messenger system or different messenger systems. Even when different messenger systems are used, the first display device and the second display device transmit and receive messages via a third chat server, thereby enabling multi-messenger chatting.

Some embodiments may be implemented in the form of recording media including instructions executable by a computer, such as a program module executable by the computer. The computer-readable recording media may be any available media that are accessible by the computer, and include both volatile and non-volatile media and both removable and non-removable media. Furthermore, the computer-readable recording media may include computer storage media. The computer storage media include both volatile and non-volatile and both removable and non-removable media implemented in any method or technology for storage of information, such as computer-readable instructions, data structures, program modules, or other data.

Embodiments of the present disclosure may be implemented as a software program including instructions stored in computer-readable storage media.

A computer is a device configured to call a stored instruction from a storage medium and perform an operation according to an embodiment of the present disclosure in response to the called instruction, and may include an electronic device according to embodiments of the present disclosure.

A computer-readable storage medium may be provided in the form of a non-transitory storage medium. In this regard, the term 'non-transitory' refers to the storage medium not including a signal and being a tangible device, and the term does not differentiate between data being semi-permanently stored in the storage medium and data being temporarily stored in the storage medium.

Furthermore, control methods according to the embodiments of the present disclosure may be included in the form of a computer program product when provided. The computer program product may be traded, as a product, between a seller and a buyer.

The computer program product may include a software program and a computer-readable storage medium having stored thereon the software program. For example, the computer program product may include a product (e.g., a downloadable application) in the form of a software program electronically distributed by a manufacturer of a device or through an electronic market (e.g., Google Play Store™ and App Store™). For such electronic distribution, at least a part of the software program may be stored on the storage medium or may be temporarily generated. In this case, the storage medium may be a storage medium of a server of the manufacturer, a server of the electronic market, or a relay server for temporarily storing the software program.

In a system including a server and the device, the computer program product may include a storage medium of the server or a storage medium of the device. Alternatively, in a case in which there is a third device (e.g., a smartphone) communicatively connected to the server or the device, the computer program product may include a storage medium of the third device. Alternatively, the computer program product may include a software program itself that is transmitted from the server to the device or the third device or that is transmitted from the third device to the device.

In this case, one of the server, the device, and the third device may execute the computer program product to perform methods according to example embodiments of the present disclosure. Alternatively, two or more of the server, the device, and the third device may execute the computer program product to perform the methods according to the example embodiments of the present disclosure in a distributed manner.

For example, the server (e.g., a cloud server or artificial intelligence (AI) server) may execute the computer program product stored therein to control the device communicatively connected to the server to perform the methods according to the embodiments of the present disclosure.

In another example, the third device may execute the computer program product to control the device communicatively connected to the third device to perform the methods according to the example embodiments of the present disclosure. In a case in which the third device executes the computer program product, the third device may download the computer program product from the server and execute the downloaded computer program product. Alternatively, the third device may execute the computer program product that is pre-loaded therein to perform the methods according to the example embodiments of the present disclosure.

Also, in this specification, the term "unit" may be a hardware component such as a processor or circuit, and/or a software component executed by a hardware component such as a processor.

The above description of the present disclosure is provided for illustration, and it will be understood by one of ordinary skill in the art that changes in forms or details may be readily made therein without departing from technical idea or essential features of the present disclosure. Accordingly, the above-described embodiments and all aspects thereof are merely examples and are not limiting. For example, each component defined as an integrated component may be implemented in a distributed fashion, and likewise, components defined as separate components may be implemented in an integrated form.

The scope of the present disclosure is not limited by the detailed description thereof but by the following claims, and all the changes or modifications within the meaning and scope of the appended claims and their equivalents should be construed as being included in the scope of the present disclosure.

What is claimed is:

1. A method of performing a messenger connection control between an electronic device and a display device in a server, the method comprising:
   receiving, by the server, a request for a connection to the display device from the electronic device via a messenger application;
   identifying, by the server, the messenger application used for the received connection request, as one of a plurality of different messenger applications, each associated with a respective message format or message transmission path;
   performing, by the server, authentication of the electronic device and the display device;
   based on the performed authentication of the electronic device and the display device, generating, by the server, messenger connection information including messenger identification information indicating the identified messenger application, user identification information for identifying a user using the messenger application on the electronic device, and connected device identification information for identifying the display device; and
   performing, by the server, based on the generated messenger connection information, messenger connection control between the authenticated electronic device and the authenticated display device.

2. The method of claim 1, further comprising:
   receiving, from the electronic device, via the messenger application, an authentication number generated by the display device and output on a screen of the display device,
   receiving, from the display device, the authentication number generated by the display device, and
   determining whether the authentication number output from the display device matches the authentication number received from the electronic device.

3. The method of claim 1, further comprising:
   receiving a message to be delivered to the display device from the user;

processing the received message based on messenger identification information corresponding to the message; and transmitting the processed message to the display device.

4. An operation method of a display device, the operation method comprising:

receiving a first message transmitted via a messenger system;

identifying messenger connection information corresponding to a user of an electronic device who transmitted the first message and a messenger application used for the received first message, the messenger application being one of a plurality of different messenger applications, each associated with a respective message format or message transmission path;

obtaining stored profile information corresponding to the identified messenger connection information; and responding to the first message or controlling an operation of the display device, based on the obtained stored profile information.

5. The operation method of claim 4, further comprising:

collecting, based on the identified messenger connection information, information about behavior of the user performed on the display device or information about an environment of the display device; and generating, as the stored profile information corresponding to the identified messenger connection information, the collected information about the behavior of the user or the collected information about the environment of the display device.

6. The operation method of claim 5, further comprising:

obtaining content information or advertisement information recommended based on the profile information corresponding to the messenger connection information regarding the user; and transmitting a second message relating to the obtained recommended content information or the obtained advertisement information to the electronic device for output to the user via the messenger application.

7. The operation method of claim 5, further comprising switching between a family mode in which the display device is not messenger-connected and a messenger connection mode in which the display device is messenger-connected to the user.

8. The operation method of claim 7, further comprising:

switching to the family mode based on the messenger connection being released while the display device is operating in the messenger connection mode, and controlling the display device to change the environment of the display device based on default profile information corresponding to the family mode.

9. The operation method of claim 7, wherein the switching further comprises, in response to reception of a request to power off the display device while the display device is operating in the messenger connection mode, controlling the display device to maintain the messenger connection mode when the display device is powered on within a predetermined time after power off or switch to the family mode when the display device is powered on after a lapse of the predetermined time.

10. The operation method of claim 7, further comprising:

in response to reception of a content sharing request message from the user during playback of content in the messenger connection mode, controlling generation of a chat room including metadata containing information about the playback content;

sharing the metadata about the generated chat room on a counterpart display device of a counterpart user with whom to share the content; and displaying, according to the sharing operation, a multiview including a content play window and a chat window corresponding to the generated chat room.

11. The operation method of claim 10, further comprising:

controlling a key used to access the chat room to be provided to a counterpart electronic device of the counterpart user with whom to share the content, receiving, from the counterpart display device connected to the counterpart electronic device, a request to access the chat room using the controlled key, and according to authentication of the controlled key in response to the request to access the chat room, transmitting the metadata about the chat room to the counterpart display device, wherein the shared metadata about the generated chat room includes information about the content to be shared and address information for accessing the chat room.

12. The operation method of claim 5, further comprising switching to a messenger connection mode corresponding to the user in response to reception of the first message from the user, from a family mode in which the display device is not messenger-connected or from a state in which the display device is messenger connected to another user, wherein the switching further comprises:

obtaining, as the identified messenger connection information, messenger connection information regarding the user who transmitted the first message, and controlling an operation of the display device based on profile information corresponding to the identified messenger connection information.

13. The operation method of claim 12, wherein the switching further comprises controlling the display device to automatically execute an application included in the profile information according to the profile information corresponding to the identified messenger connection information.

14. The operation method of claim 13, further comprising:

controlling an environment of the display device based on environment settings information included in the profile information or performing automatic login to the application according to account login information included in the profile information.

15. A server computing apparatus for performing messenger connection control between an electronic device and a display device, the server computing apparatus comprising:

a communication interface including a communication interface circuit;

memory storing one or more instructions; and a processor, comprising processing circuitry, configured to execute the one or more instructions stored in the memory and to control the server computing apparatus to:

receive a request for a connection to the display device from the electronic device via a messenger application, identify the messenger application used for the received connection request, as one of a plurality of different messenger applications, each associated with a respective message format or message transmission path, perform authentication of the electronic device and the display device, based on the performed authentication of the electronic device and the display device, generate messenger connection information including messenger identification information indicating the identified messenger application, user identification information for identifying a user using the messenger application on the electronic device, and connected device identification information for identifying the display device, and perform, based on the generated messenger connection information, the messenger connection control between the authenticated electronic device and the authenticated display device.

16. The server computing apparatus of claim 15, wherein the processor is further configured to control the server computing apparatus to:

receive, from the electronic device, via the messenger application, an authentication number generated by the display device and output on a screen of the display device, receive, from the display device, the authentication number generated by the display device, and determine whether the authentication number output from the display device matches the authentication number received from the electronic device.

17. The server computing apparatus of claim 15, wherein the processor is further configured to control the server computing apparatus one of more instructions to:

receive a message to be delivered to the display device from the user, process the received message based on messenger identification information corresponding to the message, and transmit the processed message to the display device.

18. A display device comprising:

a communication interface including a communication interface circuit;

memory storing one or more instructions; and a processor, comprising processing circuitry, configured to execute the one or more instructions stored in the memory and to control the display device to:

receive a first message transmitted via a messenger system, identify messenger connection information corresponding to a user of an electronic device who transmitted the first message and a messenger application used for the received first message, the messenger application being one of a plurality of different messenger applications, each associated with a respective message format or message transmission path, obtain stored profile information corresponding to the identified messenger connection information, and respond to the first message or control an operation of the display device, based on the obtained stored profile information.

19. The display device of claim 18, wherein the processor is configured to control the display device to:

collect, based on the identified messenger connection information, information about behavior of the user performed on the display device or information about an environment of the display device, and generate, as the stored profile information corresponding to the identified messenger connection information, the collected information about the behavior of the user or the collected information about the environment of the display device.

20. The display device of claim 18, wherein the processor is configured to control the display device to switch between a family mode in which the display device is not messenger-connected and a messenger connection mode in which the display device is messenger-connected to the user.

* * * * *